United States Patent [19]
Nagasawa et al.

[11] Patent Number: 5,859,820
[45] Date of Patent: Jan. 12, 1999

[54] OPTICAL DISK DRIVE AND OPTICAL DISK HAVING A CONTINUOUS INFORMATION TRACK FORMED OF ALTERNATING LAND AND GROOVE REVOLUTIONS

[75] Inventors: Masato Nagasawa; Kouichi Komawaki; Yoshinobu Ishida; Tsuyoshi Katayama, all of Tokyo, Japan

[73] Assignee: Mitsubishi Denki Kabushiki Kaisha, Tokyo, Japan

[21] Appl. No.: 816,799

[22] Filed: Mar. 19, 1997

[30] Foreign Application Priority Data

Mar. 25, 1996 [JP] Japan .................................. 8-068731

[51] Int. Cl.$^6$ ...................................................... G11B 7/00
[52] U.S. Cl. ...................... 369/48; 369/44.26; 369/275.3
[58] Field of Search ........................... 369/48, 58, 275.1, 369/275.2, 275.3, 275.4, 32, 44.26; 360/77.08

[56] References Cited

U.S. PATENT DOCUMENTS

| 5,270,998 | 12/1993 | Uchiumi | 369/275.3 |
| 5,315,578 | 5/1994 | Furakawa | 369/275.3 |
| 5,568,459 | 10/1996 | Takamori et al. | 369/275.3 |
| 5,606,543 | 2/1997 | Sugiyama | 369/275.3 |

FOREIGN PATENT DOCUMENTS

| 0757343A1 | 8/1996 | European Pat. Off. . |
| 62-183037 | 8/1987 | Japan . |
| 4-38633 | 2/1992 | Japan . |
| 6-274896 | 9/1994 | Japan . |
| 6-290465 | 10/1994 | Japan . |
| 7-57302 | 3/1995 | Japan . |

OTHER PUBLICATIONS

Ohtake, et al "Composite Wobble Tracking in the Optical Disk System," pp. 181–188 in Optical Memory Symposium '85, held on Dec. 12–13 in 1985, published by Optical Industry Technology Promotion Association.

Kaku, et al. on "Investigation of compensation method for track offset," pp. 209–214 in Optical Memory Symposium '85, held on Dec. 12–13 in 1985, published by Optical Industry Technology PRomotion Association.

*Primary Examiner*—Nabil Hindi

[57] ABSTRACT

In an optical disk device using an optical disk of a single land/groove spiral configuration, headers dividing each track revolution into sectors have one or more mirror surface parts, and the disposition and/or length of the mirror surface parts is different between sectors at a connecting point and sectors which are not at a connecting point. The device includes a circuit for detecting a connecting point based on the position and/or length of the mirror surface part. The device is further provided with a circuit for predicting the connecting point, thereby making up for any failure of detection by the detecting circuit. Such a predicting circuit may have a circuit for predicting the connecting point based on the phase of the disk motor when a connecting point is previously detected, or alternatively a circuit for predicting the connecting point by counting the number of PLL clocks, from a sector preceding the sector which is at a connecting point.

11 Claims, 24 Drawing Sheets

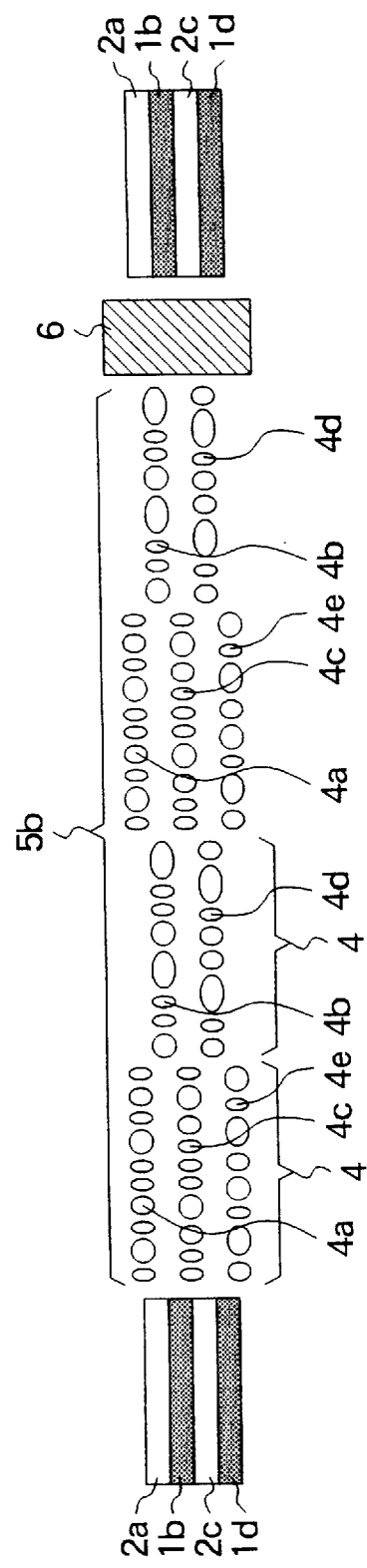

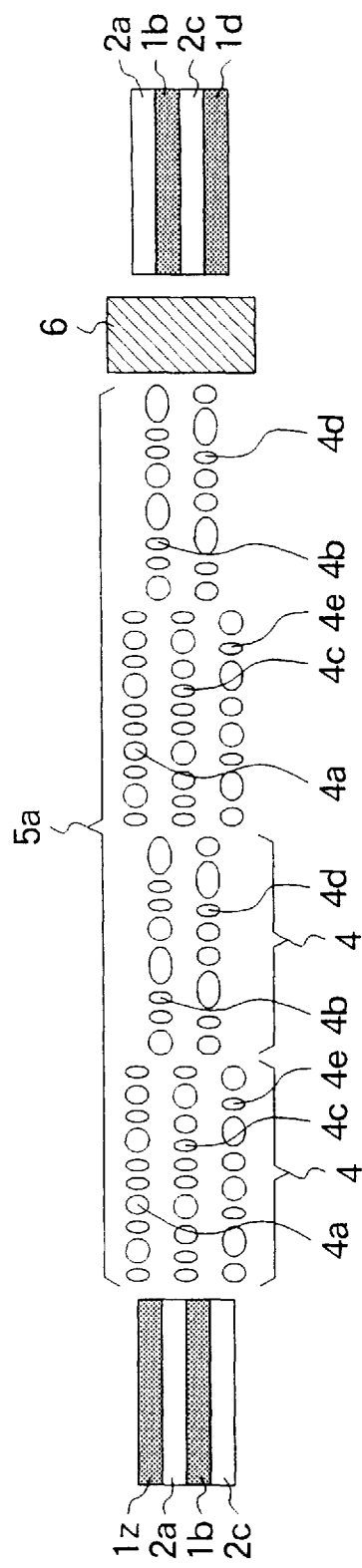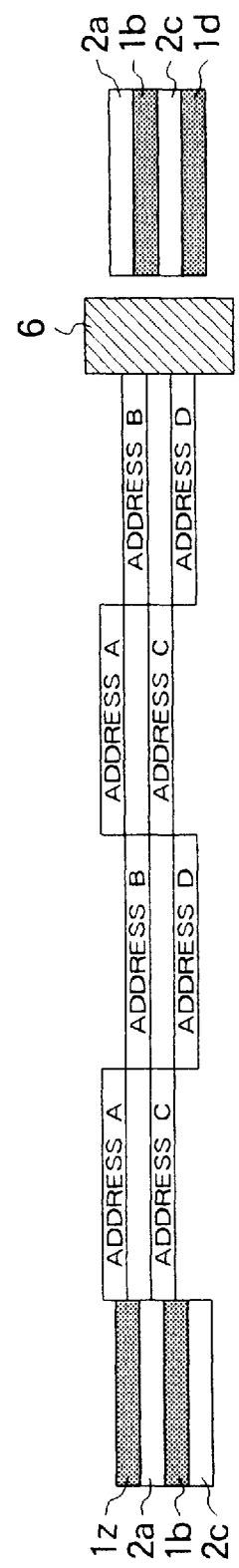

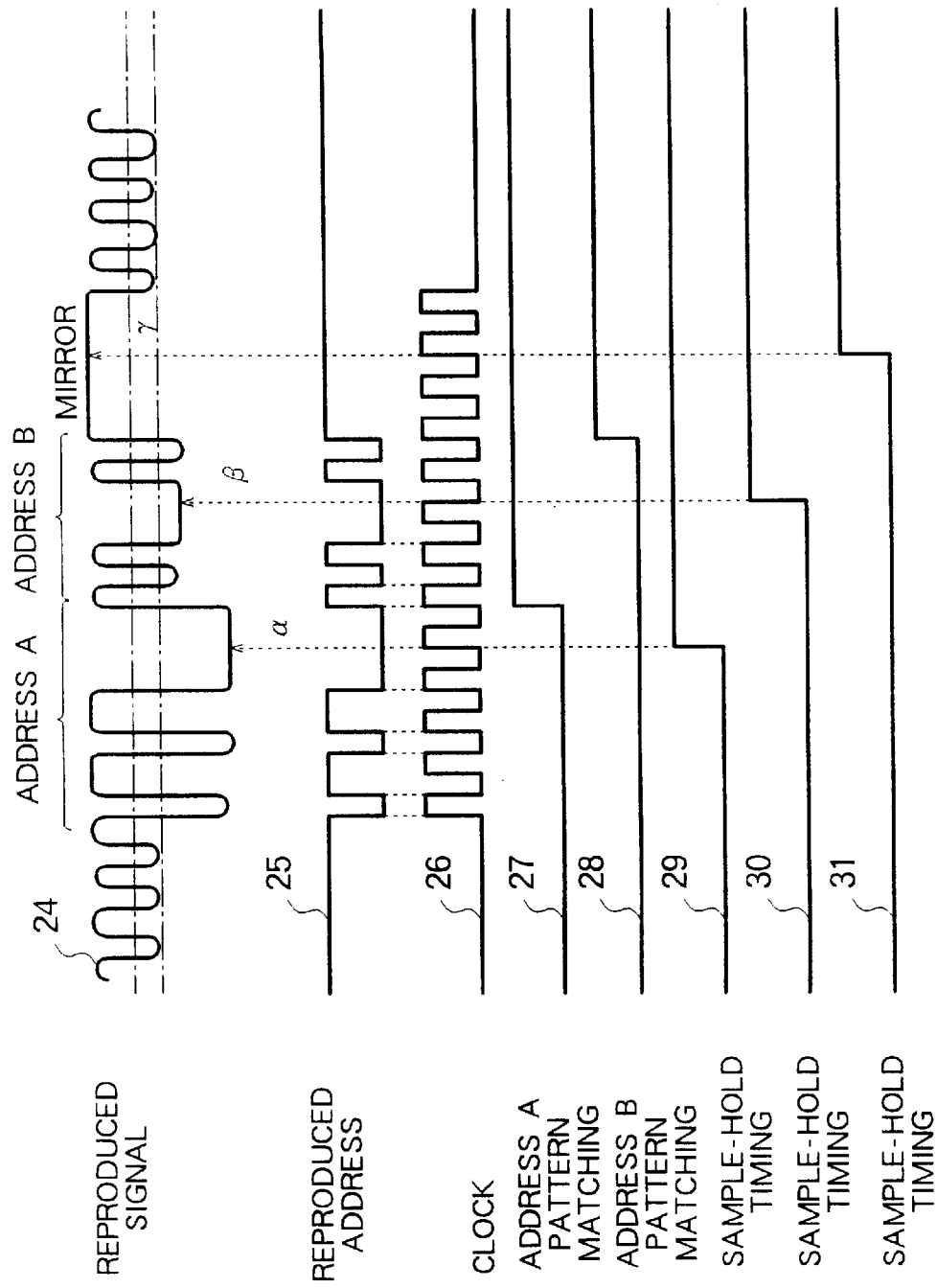

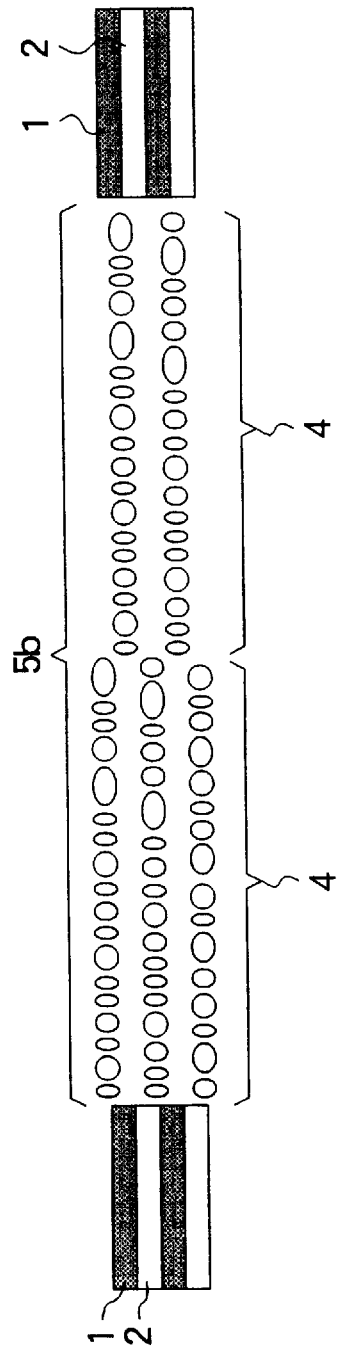
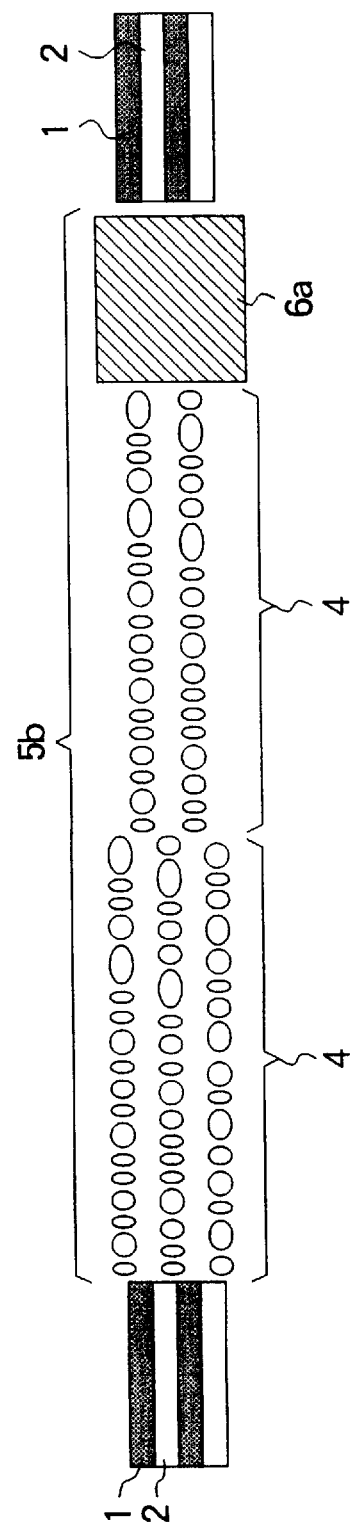

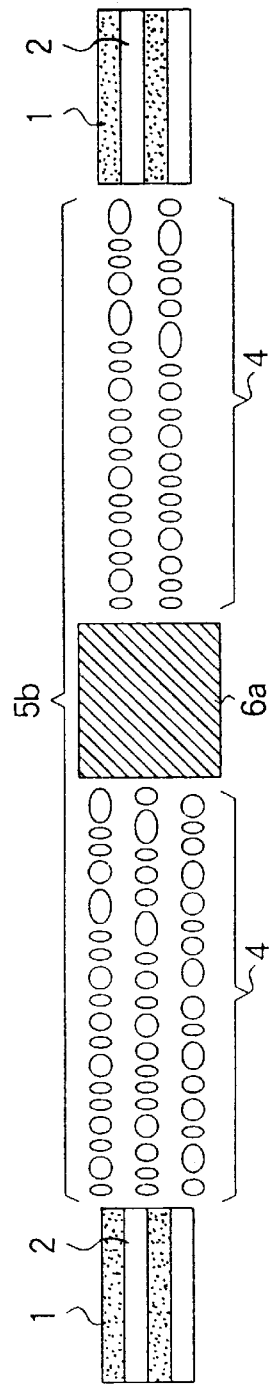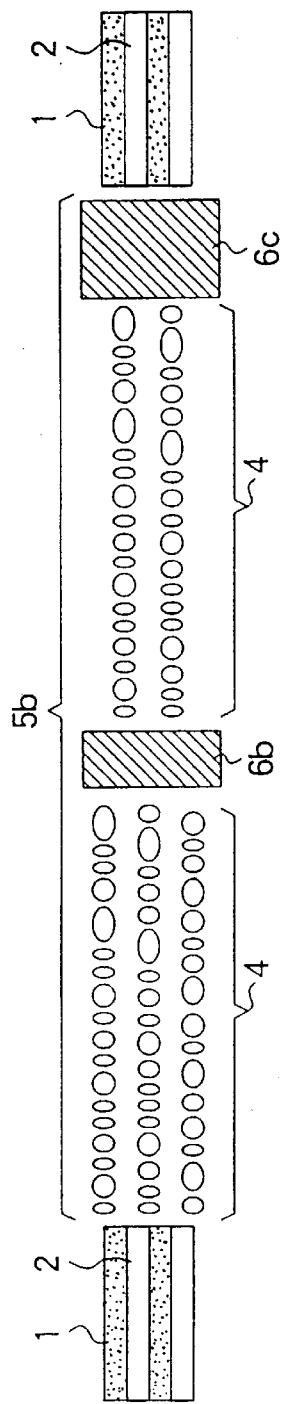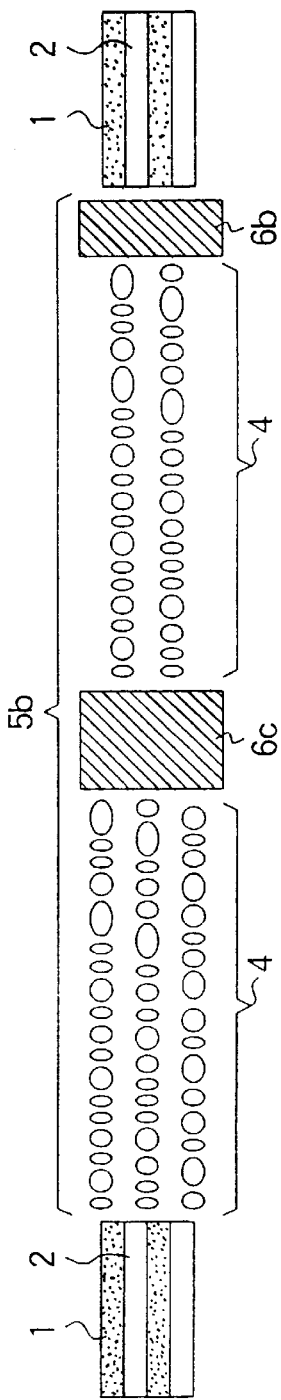

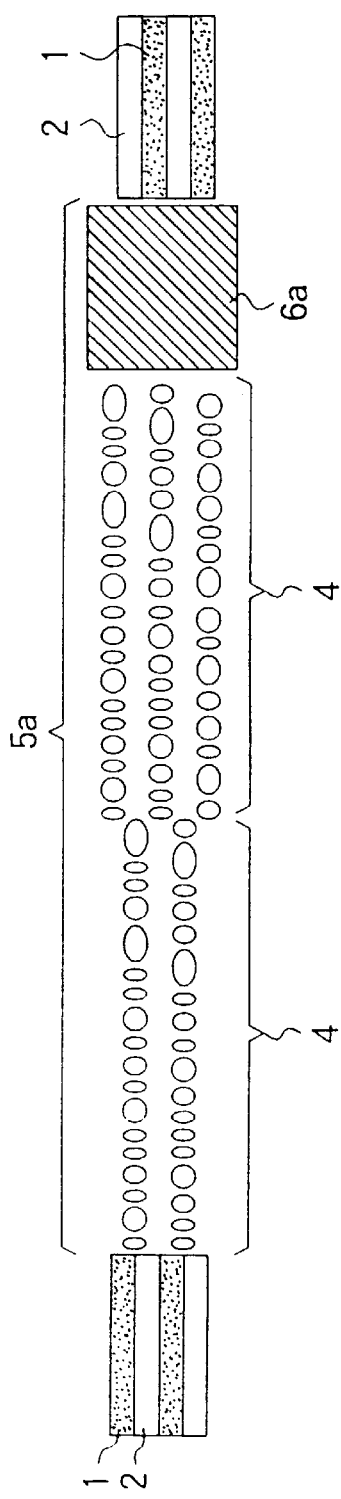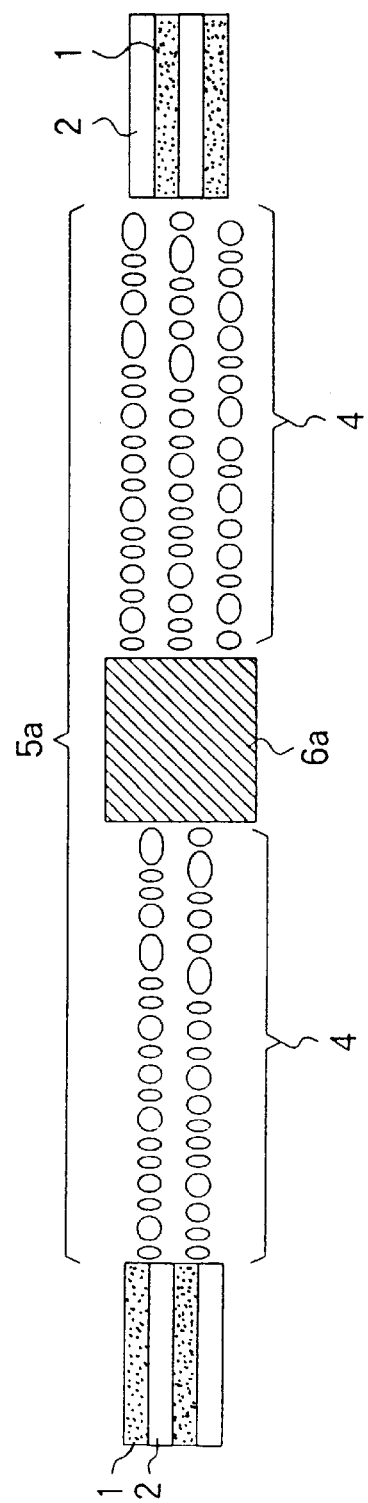

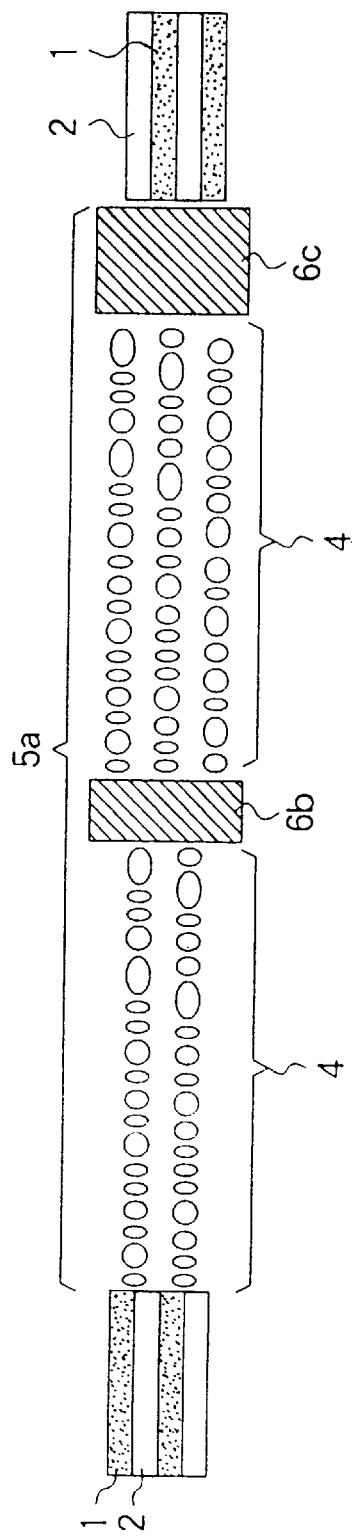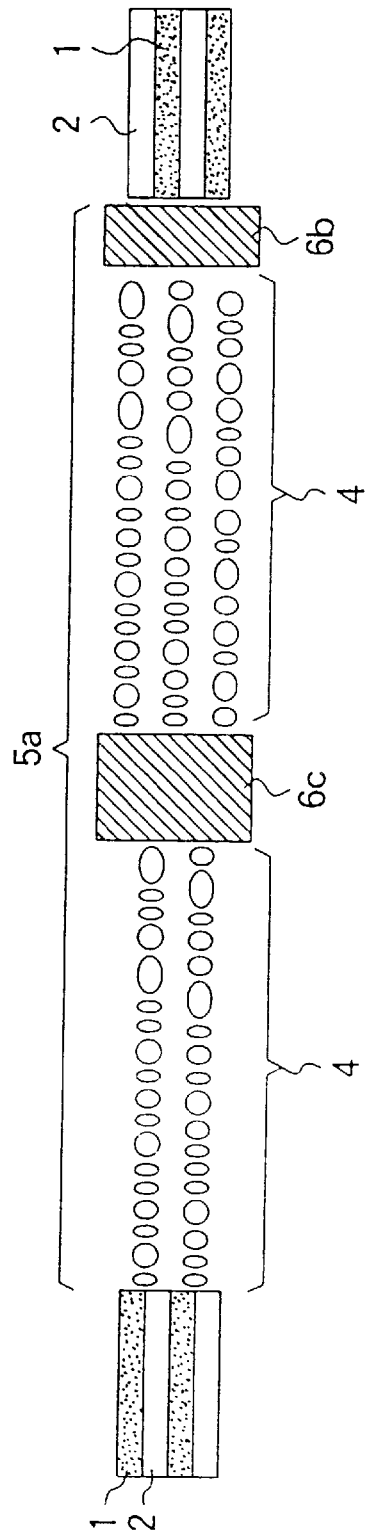

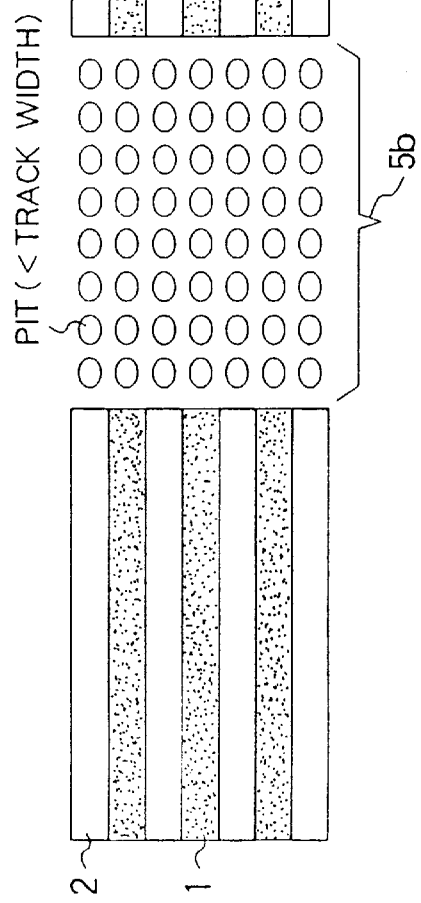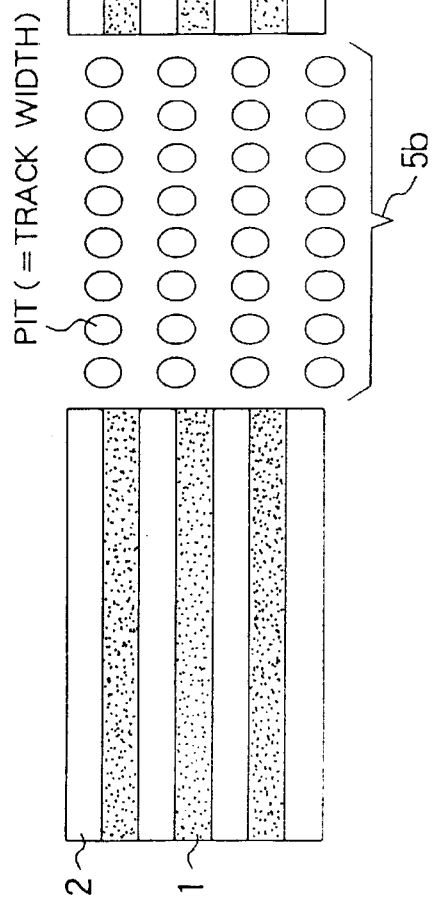
FIG. 19A PRIOR ART
FIG. 19B PRIOR ART

OPTICAL DISK DRIVE AND OPTICAL DISK HAVING A CONTINUOUS INFORMATION TRACK FORMED OF ALTERNATING LAND AND GROOVE REVOLUTIONS

BACKGROUND OF THE INVENTION

The present invention relates to an optical disk of a single-spiral land/groove configuration, wherein information is recorded on lands and grooves (hereinafter referred to as land/groove recording), land tracks and groove tracks alternate to form a single spiral.

The invention also relates to an optical disk drive device using such an optical disk.

In conventional phase-change type optical disks, data is recorded only on grooves, and lands serve to guide the light spot for tracking, and to reduce crosstalks from adjacent groove tracks. If data is recorded on lands as well, the track density can be doubled on condition that the width of the grooves and the width of the lands are both unchanged. It has has been discovered that the crosstalk between adjacent land and groove tracks is reduced if the difference in height between the lands and grooves is $\lambda/6$ ($\lambda$ being the wavelength of the light source). Owing to this discovery, the use of both of the land and groove tracks has become feasible. The use of both land and groove tracks is also advantageous with regard to the ease of mastering of the disk: it is easier to attain a certain recording density by the use of both land and groove tracks than by reducing the track pitch using only the groove tracks.

For instance, in the case of optical disks for use as computer data files, optical disks in which data is recorded both on land and groove tracks, and the tracks are concentric, so that after recording of one revolution (on a groove track, for example), a track jump is effected to start writing on the adjacent track (a Land track). Sectors are managed in accordance with the sector addresses. Accordingly, the operation for recording and reproducing data, such as computer data, which need not be continuous, can be carried out without difficulty.

Rewritable optical disks are however also used for recording continuous data such as motion picture, or music. In multimedia applications (where computer data and video and audio data are mixed), spiral tracks, as in compact disks, may be preferred because of the continuity of the tracks. For instance, FIG. 18 shows a track pattern of a disk for recording on land tracks and groove tracks in the prior art. Groove tracks 1 and land tracks 2 between adjacent groove tracks 1 are divided into information recording sectors by header parts 5b, each sector forming a unit for recording data. The groove tracks and Land tracks may sometimes referred simply as "grooves" and "lands," respectively.

With the configuration shown in FIG. 18, all the groove tracks 1 form a single spiral, and all the land tracks 2 form another spiral. For recording or reproduction, the light beam traces from the beginning (inner end) of the spiral formed of the groove tracks, for example, and upon arrival at the end (outer end) of the spiral, the light beam jumps to the beginning of the other spiral formed of the land tracks. Switching between the groove track spiral and the land track spiral requires access between the inner and outer peripheries of the information recording region of the disk, and therefore a certain time delay is inevitable.

The information recording region of the disk may be divided into annular zones, so that the length over which the light spot must jump for switching between the groove track spiral and the land track spiral is shortened to the distance between the outer and inner peripheries of the annular zone. However, there is still a considerable time delay for the jump.

FIG. 19A and FIG. 19B show details of the header portion in a conventional optical disk wherein data is recorded on both groove and land tracks. FIG. 19A shows the case where headers 5b are provided separately for the land and groove tracks, and addresses dedicated to the sectors in the respective tracks are formed. FIG. 19B shows the case where headers 5b are provided on an extension of a boundary between land and groove tracks, and each address is shared by the sectors in the land and groove tracks separated by the boundary. In either case, the headers include address pits.

The header portion 5b is formed of embossments (dents or projections) physically formed for representing the address information arid the like of the sector preceded by the header. Specifically, pits having the same height as the lands, or pits having the same depth as the grooves are formed in the header portion where no tracks are formed.

There are several methods for forming prepits suitable for the land/groove recording configuration. Two principal ones are those shown in FIG. 19A and FIG. 19B. In the configuration shown in FIG. 19A, dedicated prepits are provided for each sector of the land or groove track. Because the dedicated prepits can record various items of information, such as the one indicating whether the sector following the dedicated prepits is a land track sector or a groove track sector, control in the optical disk drive device is facilitated. However, the width of the prepits must be sufficiently narrower than the track width. This means that the laser beam used for forming the tracks cannot be used for forming the prepits, but a Less powerful laser beam must be used for the formation of the prepits, and the fabrication of the medium is difficult.

In the configuration shown in FIG. 19B, the prepits are shared by the land and groove tracks adjacent to each other. The prepits can be formed by the using the same laser beam used for forming the tracks, and by shifting the laser beam by half a track pitch laterally of the track, i.e., in the radial direction of the disk. However, during writing or reading of the disk, the shared prepits cannot indicate whether the sector following the prepits is in a land track or in a groove track, so that the optical disk drive device must have a means to find whether a land track or groove track is being traced by the light spot, and the control in the optical disk drive device is difficult.

In the above-described optical disk allowing recording and reproduction, it is also necessary to solve the problem of the track offset. This relates to the fact that the one beam-and-push-pull method is used for the tracking, rather than a three-beam method. This is because the recording requires a greater laser power. Also, in pit-forming recording on a write-once disk or the like, the side spots (used in a three-beam method) causes a disturbance to the tracking operation.

In a push-pull tracking, the tracking error is detected using the diffraction distribution of the light spot illuminating the pregrooves as shown in FIG. 20, and fed to the servo system. More particularly, an optical head 8 has a laser diode 60 emitting a laser beam, which is passed through a half-mirror 61 and an objective lens 62 to illuminate an optical disk 7 rotated by a disk motor 64. The reflected light beam from the light spot on the disk 7 is guided by the objective lens 62 and the half-mirror 61 and is received by a photodetector 16, and the tracking error is detected using the diffraction distribution of the light spot on the optical disk 7. The detected tracking error is used to control an actuator coil 63 for driving the objective lens 62.

For instance, a tilting of 0.7 degrees or an eccentricity of a 100 μm (equivalent to lateral movement of the objective lens 62 of 100 μm as indicated by broken lines in FIG. 20) causes shifting of a light distribution 17 on the photodetector 16, and an offset of 0.1μ. To prevent such a phenomenon, a drive device having higher mechanical and optical accuracies is used, and various other contrivances are adopted.

FIG. 21A shows the header part 5b having a mirror surface part 6 for track offset correction. FIG. 21B shows the header part 5b having wobble pits 58 and 59 for track offset correction. The wobble pit pits 58 and 59 are shifted in the radial direction by ½ of the track pitch. These methods are described in the following publications: (1) Ohtake, et. al. "Composite Wobbled Tracking in the Optical Disk System," on pp. 181–188 in Optical Memory Symposium '85, held on Dec. 12–13 in 1985, published by Optical Industry Technology Promotion Association, (2) Kaku, et al. on "Investigation of compensation method for track offset," pp. 209–214 in Optical Memory Symposium '85, held on Dec. 12–13 in 1985, published by Optical Industry Technology Promotion Association.

FIG. 22 shows a track offset correction circuit used in combination with a disk having the mirror surface portion 6 shown in FIG. 21A. A split photodetector 16 detects the tracking error by a push-pull method. An adder 11 adds the outputs of the two half-portions of the split, photodetector 16 to produce a signal indicative of the total amount of light received, which corresponds to the total amount of light reflected from the disk. A differential amplifier 12 determines the difference between the outputs of the two half-portions of the split photodetector 16, to produce a signal indicative of the tracking error. A mirror surface detector 13 detects the mirror surface portion 6. A sample-hold circuit 14 samples arid holds the tracking error signal when the light spot passes the mirror surface portion 6, and holds the sampled value as an offset information. A differential amplifier 15 determines the difference between the tracking error signal and the offset information. The output of the differential amplifier 15 indicates the tracking error having the offset removed.

FIG. 23 shows an offset correction circuit used in combination with a disk having wobble pits shown in FIG. 21B. A wobble pit detector 18 receives the output of the adder 11, and detects the wobble pits, i.e., produces a signal to a sample-hold circuit 19 when the light spot passes the wobble pit laterally shifted toward one side of the track, and produces another signal to a sample-hold circuit 20 when the Light spot passes the wobble pit laterally shifted toward the other side of the track. Responsive to these signals (i.e., when the light spot passes the wobble pits 58 and 59), the sample-hold circuits 19 and 20 sample the output of the differential amplifier 12, and holds the sampled values. A differeintial amplifier 21 determines the difference of the outputs of the sample hold circuits 19 and 20, as an offset. An adder 50 adds the tracking error signal obtained at the differential amplifier 21 to the tracking error signal obtained by means of the ordinary push-pull method, to produce the tracking error signal from which the offset has been removed.

FIG. 24 illustrates the control characteristics for the case where a tracking error signal obtained by wobble pits and the tracking error signal by means of the conventional push-pull method are both used. G1 represents a tracking open loop characteristic by means of the conventional push-pull method, and G2 denotes a tracking open loop characteristic by means of the wobble pits.

In the configuration shown in FIG. 21A, at the mirror surface portion 6, the guide grooves are discontinuous or interrupted. With this configuration, a correction circuit for correcting the mirror surface offset, shown in FIG. 22, is used. The signals output from the two half-portions o the split photodetector 16 are input to the differential amplifier 12, which thereby produces a tracking error signal. On the basis of the sum signal produced by the adder 11, the mirror surface detector 13 generates a timing signal indicating the timing at which the light beam is passing the mirror surface portion 6. The tracking error signal ΔT produced by the differential amplifier 12 includes an error component ΔTg due to the shift of the objective lens, a true tracking error ΔTs, and an offset component δ due to various causes including the tilting of the disk, so that it is given by:

$$\Delta T = \Delta Ts + \Delta Tg + \delta \quad (1)$$

The sample-hold circuit 14 samples the tracking signal at the mirror surface portion 6, and holds the sampled value. The output of the sample-hold circuit 14 represents ΔTg+δ. Accordingly, in view of the equation (1), subtracting the output of the sample-hold circuit 14 from the output of the differential amplifier 12 at the differential amplifier 15 during the scanning of the data sectors results in the true tracking signal ΔTs. In this way, a closed-Loop servo system for achieving an accurate track following can be formed.

Another method of correction is a method using wobble pits. According to this method, wobble pits shifted in opposite directions as shown in FIG. 21B are formed by alternately deflecting the light beam, using ultrasonic deflector, during fabrication of the original disk for mastering. During recording and reproduction, the outputs of the differential amplifier 12 when the light spot is passing the wobble pits on the respective sides are compared, to detect the tracking error. Specifically, a differential amplifier 21 shown in FIG. 23 determines the difference between the outputs of the sample-hold circuits 19 and 20 to obtain the tracking error. As shown in FIG. 25, when the light spot passes along a line closer to the center of the pit 58 on one side (upper side in FIG. 21B) than to the center of the pit 59 on the other side (lower side in FIG. 21B), an output signal illustrated by the dotted line is obtained. When the light, spot passes along a line closer to the center of the pit 59 on the lower side than to the center of the pit 58 on the upper side, an output signal illustrated by the solid line is obtained. The difference obtained by subtracting the output of the differential amplifier 12 obtained when the light spot is passing the wobble pit 59 at the back or one one side, from the output of the differential amplifier 12 obtained when the light spot is passing the wobble pit 58 at the front or on the other side, represents the magnitude of the tracking error and the direction of the tracking error. This means that the position at, which the true light spot passes is detected. Compared with the method relying on the diffraction distribution due to pre-grooves, the above-described method realizes a better servo system.

Another tracking method has been proposed, in which the feature of the above-described wobble pit method is maintained, and which is compatible with systems using conventional push-pull tracking method. The sector configuration in this system is composed of an index field with pre-pits shown in FIG. 21B, and user data field. The index field is provided with address information, as well as wobble pits which may or may not serve also as a sector detection mark, and pre-grooves for tracking. With such a configuration, the true tracking error is detected from the wobble pits, and the offset used in push-pull tracking can be corrected. In this case, the open-loop characteristic of the tracking servo is such that the gain for tracking on the basis of the wobble pits is relatively large in the low-frequency region, and the gain for the tracking on the basis of the push-pull method is relatively large in the high-frequency region, as shown in FIG. 24. As a result, data can be recorded and reproduced, while the light spot is maintained on the center of the track, regardless of the drive device used, and compatibility between the recorded disk and the drive device can be preserved.

With the above-described optical disk device, information is recorded on lands and grooves to increase the recording density. One way of recording continuous information, such as video and audio information, on lands and grooves in an optical disk, is to connect each revolution of land with each revolution of adjacent land, so that recording track alternate between Land and groove every revolution. In such a configuration, the polarity of tracking error signal has to be reversed every revolution. If the connecting point is not correctly detected, the servo operation may be disturbed, and tracking may fail.

In particular, such an offset is due to the error in the mounting of the tracking sensor in the optical head, and a tracking offset due to stray light, and the offset due to these factors are reversed when the polarity of the tracking error signal is reversed.

When the connecting point is not detected due to the eccentricity of the disk or vibration of the disk, the light spot may deviate to a next track, or tracking may fail.

SUMMARY OF THE INVENTION

The present invention has been achieved to solve the problems described above, and its object, is to provide an optical disk and an optical disk drive device capable of recording and reproducing continuous information on lands and grooves in an optical disk.

Another object is to provide an optical disk and an optical disk drive device with which a correct tracking offset can be instantly applied, even at the time of reversal of the tracking error signal polarity at the connecting point between Lands and grooves, and disturbance in the tracking servo is prevented at the time of the switching between lands and grooves.

A third object of the invention is to provide a method which can detect the connecting point in a primary as well as two or more secondary ways, so that, when the detection in the primary way fails, it can compensate for, i.e., make up for failure of the detection by the secondary way. Such failure of the detection in the primary way can happen because of eccentricity of the disk or vibration.

A fourth object of the invention is provide an optical disk which permits judgment of whether the next, information sector is in a land, or in a groove, and whether it is necessary to reverse the tracking polarity, during recording or reproducing information.

According to one aspect of the invention, there is provided an optical disk device using an optical disk having a continuous information track formed of land and groove alternating every revolution, each revolution of land track being connected with a revolution of groove track, each revolution of the track being divided into sectors by headers, each header having one or more mirror surface parts, the disposition and/or length of the mirror surface parts being different between sectors at a connecting point, and sectors which are not at a connecting point, the device comprising:

a rotation device including a disk motor for rotating the disk;

a device for detecting a connecting point based on the position and/or length of the mirror surface part; and a predictor for predicting the connecting point based on the phase of the disk motor at the timing when a connecting point is previously detected, whereby any failure of detection of the connection point by the detecting device is made up for by the predictor.

With the above arrangement, the rotary angle of the disk motor, or the measurement of the encoder is stored when (e.g., each time) a connecting point is successfully detected, and when detection of the connecting point based on the disposition and/or length of the mirror surface parts fails, due for example to eccentricity of the disk or vibration of the device, the rotary angle or position stored previously is used for prediction the connecting point. That is when the rotary angle or position is reached, the header is assumed to be at a connecting point. Upon such assumption, the tracking polarity is reversed. Accordingly, failure of tracking due to errors in detecting the connecting point, or erroneous detection of a connecting point can be prevented.

Moreover, by the use of the motor encoder, when the detection of the address information is not completely successful, or when the the motor rotation speed is changed due to the transition from one zone to another, for example, accurate prediction of the connecting point timing can be achieved.

According to another aspect of the invention, there is provided an optical disk device using an optical disk having a continuous information track formed of land and groove alternating every revolution, each revolution of land track being connected with a revolution of groove track, each revolution of the track being divided into sectors by headers, each header having one or more mirror surface parts, the optical disk device including:

a data detecting circuit including a PLL circuit producing clocks; and a predictor for predicting the connecting point by counting the clocks from the PLL circuit, from a sector preceding the sector which is at a connecting point.

It may be so configured that the disposition and/or length of the mirror surface parts is different between sectors at a connecting point and sectors which are not at a connecting point;

the optical disk device further includes a device for detecting a connecting point based on the position and/or length of the mirror surface part; and any failure of detection of the connecting point by the detecting device is made up for by the predictor.

With the above arrangement, because the timing is obtained based on the PLL clocks in the reproduced data, the need for the motor encoder is obviated.

According to a further aspect of the invention, there is provided an optical disk device using an optical disk having a continuous information track formed of land and groove alternating every revolution, each revolution of land track being connected with a revolution of groove track, each revolution of the track being divided into sectors by headers, each header having one or more mirror surface parts, the optical disk device including:

a rotation devices for rotating the disk;

a PLL circuit including a voltage controlled oscillator whose center frequency is at the frequency of the rotation of the disk; and a predictor for predicting the connecting point based on the output of the PLL circuit, by counting the clocks from the WILL circuit, from a sector preceding the sector which is at a connecting point.

It may be so configured that the disposition and/or length of the mirror surface parts is different between sectors at a connecting point and sectors which are not at a connecting point;

the optical disk device further includes a device for detecting a connecting point based on the position and/or length of the mirror surface part; and any failure of detection of the connecting point by the detecting device is made up for by the predictor.

With the above arrangement, the timing signal is input to the PLL circuit such that the center frequency of the VCO is equal to the frequency of rotation of the disk. When the detection of the connecting point fails, such failure is made up for by the free-run signal of the VCO.

By obtaining the timing signal via the PLL circuit, the spurious or unnecessary matching signal due to erroneous detection can be removed. When detection of the connecting point fails, such a failure is made up for. Even during failure of tracking, due to eccentricity of the disk or vibration of the device, provided that the rotation of the disk is at a constant speed, the timing of detection of the connecting point can be made to align with the detection at the previous (immediately preceding and even earlier) detection of the connecting point. According accurate detection of the connecting point can be achieved.

According to a further aspect of the invention, there is provided an optical disk having a continuous information track formed of land and groove alternating every revolution, each revolution of land track being connected with a revolution of groove track, each revolution of the track being divided into sectors by headers, pit sequences in said headers being shifted in the radial direction to form wobble pits, the order or the directions of the shifting of the pit sequences as they are scanned by a light spot being changed at a connecting point.

Each header may have one or more mirror surface parts, at least one of the disposition and length of the mirror surface parts being different between sectors at a connecting point and sectors which are not at a connecting point.

According to a further aspect of the invention, there is provided an optical disk device using the optical disk of the above configuration, the device including:

a device for illuminating and scanning the disk with a light spot;

a device for detecting the envelope of the reproduced signal as the light spot is scanning the wobble pits;

a device responsive to the output of the envelope detecting means for detecting the order of the shifting of the wobble pits as the light spot scans the header;

a device responsive to the output of the order detecting means for determining whether the header being scanned is at a connecting point or not.

The detection of the connecting point according to the order of the shifting of the wobble pits can be used in combination with the detection of the connecting point based on the position and length of the mirror surface part. This will further improve the reliability of the detection.

The optical disk drive device may further include:

a split photodetector, having four light receiving faces, for reproducing the recorded information and detecting servo error information; and a device responsive to the outputs of the four light receiving faces for reproducing the wobble pits from the light receiving faces on the respective sides of the split photodetector.

By envelope detecting the sum signal of the two channel on each side, the connecting point can be detected.

The above mentioned device for determining whether the header being scanned is at a connecting point may include an element for performing pattern matching on the output of the envelope detecting device.

BRIEF DESCRIPTION OF THE DRAWINGS

FIG. 2 shows header parts which are not at a connecting point between land and groove tracks in an optical disk according to Embodiment 1.

FIG. 3A and FIG. 3B show header parts which are at a connecting point between land and groove tracks in an optical disk according to Embodiment 1.

FIG. 7 is a timing chart showing an operation of the optical disk drive device, for detecting the mirror surface part and the wobble pits.

FIG. 8A, FIG. 8B, FIG. 9A, FIG. 9B, FIG. 9C, FIG. 10A, FIG. 10B, FIG. 11A and FIG. 11B show different configurations of the headers.

FIG. 19A and FIG. 19B show header parts at a connecting point between land and groove tracks in the optical disk of FIG. 18.

DETAILED DESCRIPTION OF THE PREFERRED EMBODIMENTS

Embodiments of the invention will now be described with reference to the drawings.

Embodiment 1

Figure 1:
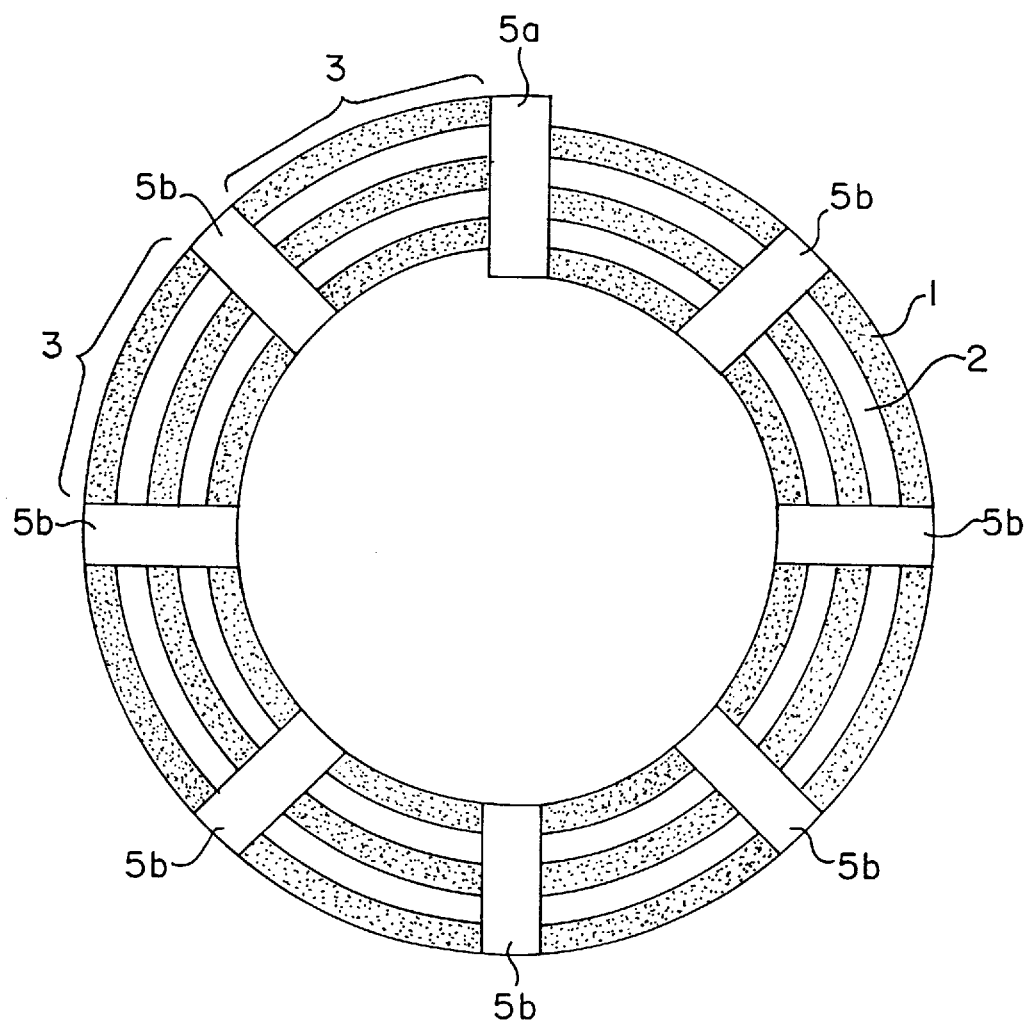
FIG. 1 shows an overall configuration of the land and groove tracks in an optical disk according to Embodiment 1.

The overall configuration of the disk of this embodiment is as shown in FIG. 1. As illustrated, the optical disk is of a single-spiral configuration, in which groove tracks 1 and Land tracks 2 are connected at headers 5a forming connecting points, occurring every revolution, so that groove tracks 1 and land tracks 2 alternate along a single continuous spiral track. The tracks are divided into sectors 3 by the header regions 5a, at the connecting points as described above, or header regions 5b which are not at the connecting points. The header in each header region is associated with the sector following the header. In the illustrated example, there are 8 sectors per revolution. In an actual design of an optical disk, there are tens of sectors per revolution.

The configuration of the header region 5b at the connecting point in Embodiment 1 is as illustrated in FIG. 2. Specifically, FIG. 2 shows an arrangement of pits in one or the header regions 5b.

As illustrated, a land track 2a (one of the Land tracks 2, but denoted by 2a for distinction from other land tracks) is interrupted by the header region 5b. That is, the land track 2a on one side (e.g., to the left of the header region 5b in FIG. 2) and the land track 2a on the other side (to the right of the header region 5b) are aligned with each other, and the light, spot having passed the land track 2a on the left, crosses the header region 5b, and then traces the land track 2a on the right.

The configuration of the header region 5a at the connecting point in Embodiment 1 is as illustrated in FIG. 3A and FIG. 3B. Specifically, FIG. 3A shows an arrangement of pits, and FIG. 3B shows an arrangement of address data.

As illustrated, at the connecting point, a groove track 1z preceding the header region 5a (to the left of the header region 5a, in FIG. 3A) and a land track 2a following the header region 5a (to the right of the header region 5a, in FIG. 3A) are aligned with each other and is effectively connected. In other words, light spot (not shown) having passed the groove track 1z (on the left) then passes the header region 5a, and then the land track 2a (on the right). Similarly, the light spot having passed the land track 2a (on the left), then passes the header region 5a, and then the groove track 1b (on the right).

Two sets or sequences of address pits 4a in the header region 5a or 5b indicating the address of the sector in the land track 2a following the header region 5a or 5b are shifted in a first direction lateral of the land track 2a, i.e., radially inward (or upward in FIG. 3A) by half a track pitch (a full track pitch being the distance between the land and groove tracks adjacent to each other) with respect to the land track 2a having the sector whose address is indicated by the address pits. Two sequences of address pits 4b in the header region 5a or 5b indicating the address of the sector in the groove track 1b following the header region 5a or 5b are shifted in the same, first direction lateral of the groove track 1b, i.e., radially inward (or upward in FIG. 3A) by half a track pitch with respect to the groove track 1b having the sector whose address is indicated by the address pits. The combination of the sequences of address pits are also called wobble pits, and are used for detecting the tracking error and is used to remove the offset in the tracking error signal, as will be described later. The wobble pits can also be used to determine whether the sector following the wobble pits is in a land track or in a groove track.

The address pits 4b are shifted with respect to the address pits 4a in the direction of the track, so that the they do not overlap in the radial direction. More specifically, the address pits 4a and 4b are so arranged in the direction of the track such that they are scanned by the light spot in the order of a sequence of address pits (4a, for example) for the sector in the land track, a sequence of address pits (4b, for example) for the sector in the groove track, a sequences of address pits (4a) for the sector in the land track, and finally sequence of address pits (4b) for the sector in the groove track.

As a result, in the header region 5a or 5b, the light spot scans the sequence of address pits 4a shifted in the first direction (radially inward, or upward in FIG. 3A), then the sequence of address pits 4b shifted in the second direction (radially outward, or downward in FIG. 3A), then the sequence of address pits 4a shifted in the first direction and finally the sequence of the address pits 4b shifted in the second direction, before scanning a land track (2a, for example). On the other hand, before scanning a groove track (1b, for example), the light spot scans the sequence of address pits 4c shifted in the second direction, then the sequence of address pits 4b shifted in the first direction, then the sequence of address pits 4c shifted in the second direction and finally the sequence of the address pits 4b shifted in the first direction.

Thus, by detecting the sequence of the direction of shifting of the address pits, i.e., whether it is first, second, first and second directions; or second, first, second and first directions, it is possible to determine whether the track following the header region is a land track, or a groove track. Such detection of the direction of the shifting in the radial direction (Lateral direction of the track) can be made on the basis of the tracking error signal.

Because the address pits (4a and 4b, for example) for the sectors on land and groove tracks 2a and 1b adjacent to each other are not overlapped with each other, the pitch of the address pits in the radial direction is twice the track pitch. The address pits may therefore have the same width as the land or groove tracks, so that the address pits can be formed using the same laser beam as that used for forming the land or groove tracks.

The value or contents of the respective sequences of address pits are as shown in FIG. 3B.

In the example shown in FIG. 3B, the same address value (e.g., any of "A," "B," "C," and "D") is repeated twice. That is, the address is duplicated. The same address track (e.g., A) is represented by the address pits shifted in one direction. Different addresses (e.g., "A" and "B") alternate.

A mirror surface part 6 is a part where no lands and grooves are formed. In other words, grooves and lands are interrupted at the mirror surface part.

At the header regions 5a which are at the connecting points, the polarity of the tracking error signal must be reversed, while at the remaining header regions 5b, such reversal is not required.

Figure 4:
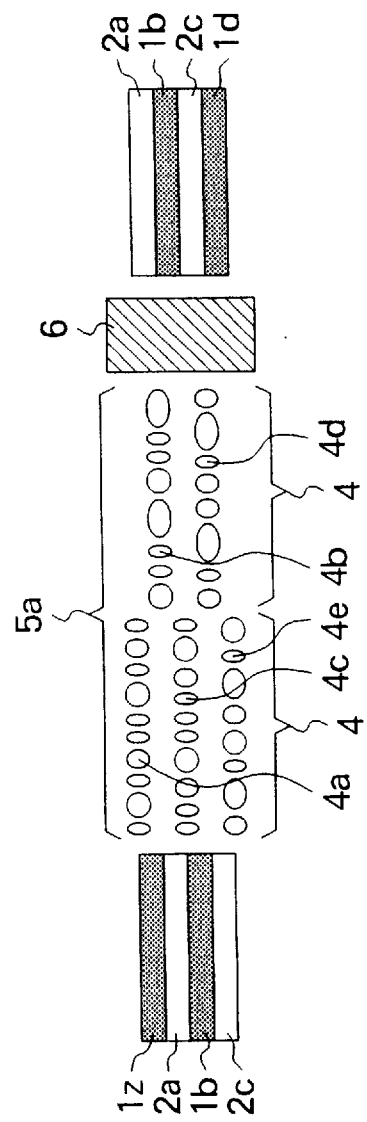
FIG. 4 shows another example of header parts at a connecting point between land and groove tracks in an optical disk according to Embodiment 1.

Instead of providing two sequences of address pits for each sector, only one sequence of address pits may be provided as in FIG. 4. In the following description of, for instance, signal processing such as sample-holding, it is sometimes assumed there are only one sequence of address pits, for simplification of explanation. However, the same description is applicable to cases where there are two or more sequences of address pits for each sector, if means are provided to select one of the sequences for the purpose of sampling. As an alternative, sampling may be effected at all the sequences of address pits, and an average or some other combination of the sampled values may be used.

Figure 5:
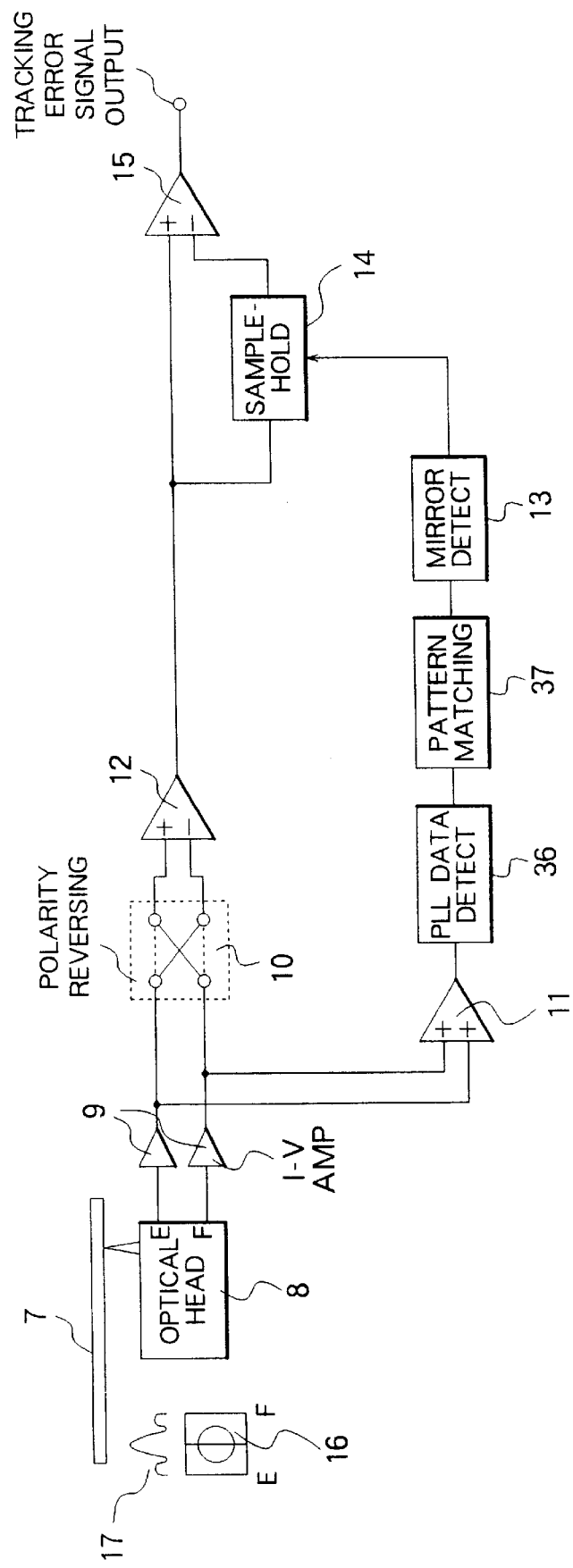
FIG. 5 is a block diagram showing a part of an optical disk drive device concerning the tracking error signal offset correction using mirror surface parts, according to Embodiment 1.

FIG. 5 is a block diagram showing part of an optical disk drive device concerning track offset correction using a mirror surface part.

Light reflected from an on optical disk 7 is received by a tracking sensor 16, in the form of a split photodetector, provided in an optical head 8. The tracking sensor 16 is illustrated outside of the optical head 8, but it is actually within the optical head 8. A typical distribution of light received by the tracking sensor 16 is also illustrated by a curve 17. I–V amplifiers 9 convert the photo-currents output from the respective half portions of the tracking sensor 16, into voltage signals. A polarity reversing circuit 10 reverses the tracking polarity, i.e., the polarity of the tracking error signal. An adding amplifier 11 determines the amount of light reflected from the optical disk 7. A differential amplifier 12 determines the difference of the outputs or the two half portions of the tracking sensor 16, called E and F channels of the tracking sensor 16. A PLL and data detector 36 detects data from the reproduced signal of the address pits. A pattern matching circuit 37 makes recognition of the data. A mirror surface detecting circuit 13 detects the mirror surface part 6 formed on the optical disk 7. A sample-hold circuit 14 samples the tracking error signal when the mirror surface detector 13 detects the mirror surface part, and holds the sampled value until the next sampling. A differential amplifier 15 subtracts the output of the sample-hold circuit 14 from the output of the differential amplifier 12 to remove the offset in the tracking error signal.

Figure 6:
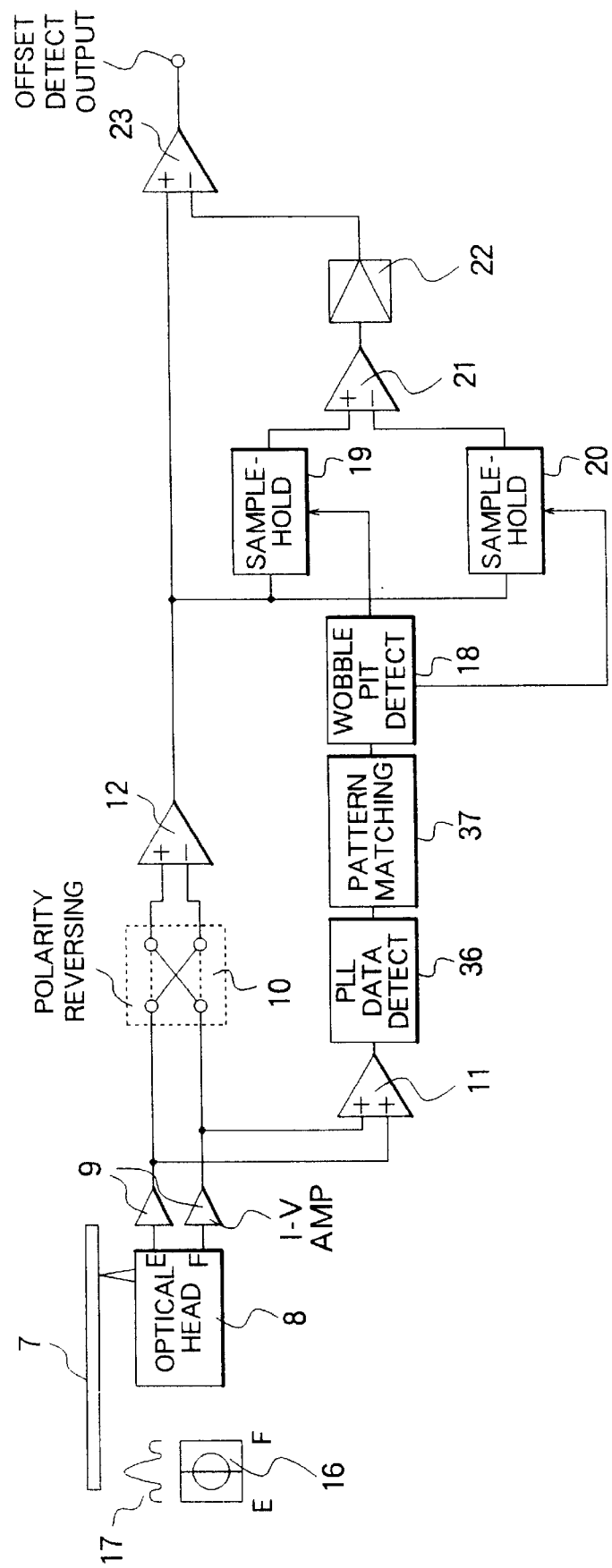
FIG. 6 is a block diagram showing a part of an optical disk drive device concerning the tracking error signal offset correction using wobble pits, according to Embodiment 1.

FIG. 6 is a block diagram of part of the optical disk drive device concerning track offset correction using the sequences of the address pits, also called wobble pits, as described above.

The circuits or members identical to those in FIG. 5 are denoted by identical reference numerals.

A wobble pit detecting circuit 18 detects the sequences of the address pits formed on the optical disk 7. Sample-hold circuits 19 and 20 sample and hold the output of the differential amplifier 12, when the light spot scans the two sequences of address pits shifted in opposite radial directions, and shifted from and adjacent to each other in the circumferential direction. For instance the sample-hold circuits 19 and 20 sample the outputs of the differential amplifier 12 when the light spot scan the sequences of the address pits that appear first and second during the scanning in the header. More specifically, when the wobble pit detecting circuit 18 produces a first signal when it detects a selected one of sequences of address pits shifted in the first direction (which may appear first or second), and produces a second signal when it detects a selected one of the sequences of address pits shifted in the second direction (which may appear second or first). The sample-hold circuit 19 samples the output of the differential amplifier 12 when the wobble pit detecting circuit 18 produces the first signal, and holds the sample signal until the next sampling. The sample-hold circuit 20 samples the output of the differential amplifier 12 when the wobble pit detecting circuit 18 produces the second signal, and holds the sample signal until the next sampling.

A differential amplifier 21 determines the difference between the outputs of the sample-hold circuits 19 and 20. A gain amplifier 22 amplifies the output, of the differential amplifier 21. Another differential amplifier 22 subtracts the output of the gain amplifier 22 from the output of the differential amplifier 12 to remove the offset from the original tracking error signal.

FIG. 7 shows the timings at which the mirror surface part and the wobble pits are detected in the optical disk drive device of Embodiment 1. It is assumed that only one sequence of address pits is provided for each sector, as illustrated in FIG. 4. However, even it there are two (or more) sequences of address pits, one of the sequences may be selected, by means of an appropriate timing detection circuit, and used in the same manner. Reference numeral 24 denotes a reproduced sum signal, 25 denotes a reproduced address signal obtained by wave-form shaping the reproduced sum signal (by a waveform shaping circuit, which is not shown, but is provided between the adder 11 and the PLL and data detecting circuit 36). Reference numeral 26 denotes a clock generated by a PLL and data detecting circuit 36 for extracting data of the reproduced address signal. Reference numeral 27 denotes a pattern matching signal of address A produced by the pattern matching circuit 37. Reference numeral 28 denotes a pattern matching signal of address B produced by the pattern matching circuit 37. Reference numerals 29 and 30 denote timings for sampling the wobble pits. Reference numeral 31 denotes a timing for sampling the mirror surface part.

FIG. 8A to FIG. 11B show disposition of address pits and mirror surface part in header portions 5a at a connecting point and header portions 5b which are not at a connecting point. FIG. 8A, FIG. 8B, FIG. 9A, FIG. 9B, and FIG. 9C show disposition of address pits in header portions 5b which are not at a connecting point, while FIG. 10A, FIG. 10B, FIG. 11A, and FIG. 11B show disposition of address pits in header portions 5a at a connecting point.

The header portion 5b shown in FIG. 8A does not have a mirror portion,

- the header portion 5b shown in FIG. 8B has a long mirror portion 6a at the tail,
- the header portion 5b shown in FIG. 9A has a long mirror portion 6a in the middle,
- the header portion 5b shown in FIG. 9B has a short mirror portion 6b in the middle and a medium-sized mirror portion 6c at the tail,
- the header portions 5b shown in FIG. 9C has a medium-sized mirror portion 6c in the middle and a short mirror portion 6b at the tail,
- the header portion 5a shown in FIG. 10A has a long mirror portion 6a at the tail,
- the header portion 5a shown in FIG. 10B has a long mirror portion in the middle,
- the header portion 5a shown in FIG. 11A has a short mirror portion 6b in the middle and a medium-sized mirror portion 6c at the tail, and
- the header portion 5a shown in FIG. 11B has a medium-sized mirror portion 6c in the middle and a short mirror portion 6b at the tail.

Figure 12:
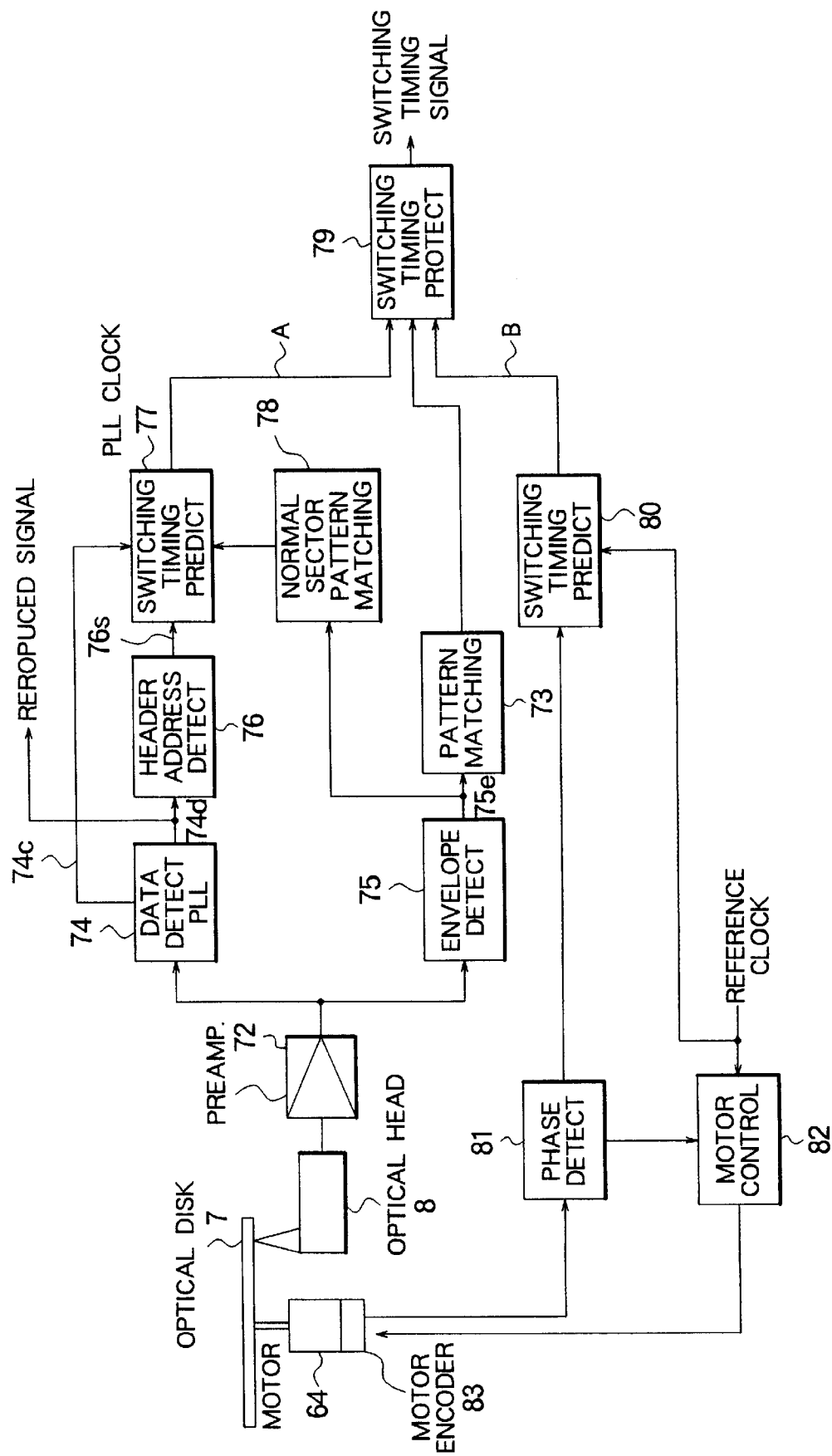
FIG. 12 is a block diagram showing an example of circuit for protecting the timing of polarity switching.

FIG. 12 is block diagram showing a circuit for detecting the polarity switching timing in plural ways. Shown in the drawings are a preamplifier 72, an envelope detecting circuit 75 for producing a reproduced envelope 75e of the reproduced signal from the address part at the head of the sector, a pattern matching circuit 73 responsive to the output 75e of the envelope detecting circuit 75, for matching the pattern generated at the mirror surface part, from the envelope 75e, and detecting the connecting points, i.e., whether the header being scanned is at a connecting point (a polarity switching point), a normal sector pattern matching circuit 78 for recognizing the latest sector address part, a data detecting PLL circuit 74 producing PLL clocks 74c and data signals 74d, a healer address detecting circuit 76 responsive to the data signals 74d from the data detecting PLL circuit 74 for detecting the address at the head of the sector, and producing a signal 76s indicating a header preceding (immediately preceding or even earlier, i.e., one or more sectors before) a healer at a connecting point, a switching timing predicting circuit 77 for predicting the timing of the polarity, i.e., connecting point by counting the number of PLL clocks 74c from the reception of the signal 76s, i.e., from the preceding (immediately preceding or even earlier) sector address detection, a phase detecting circuit 81, a motor control circuit 82, a motor encoder 83, a motor 64, and a switching timing predicting circuit 80 for storing the value of the phase of the motor encoder 83.

A switching timing protection circuit 79 for protecting the connecting point or polarity switching timing in accordance with a signal A for predicting the connecting point based on the number of PLL clocks from the preceding (immediately preceding or even earlier) sector address, and a signal B for predicting the switching timing based on the motor encoder 83.

Instead of, or in addition to predicting the connecting point based on the number of PLL clocks, it is possible to predict the connecting point based on the number of headers (which corresponds to the number of sectors). The headers for the sectors can be detected by the normal sector pattern matching circuit 78.

Figure 13:
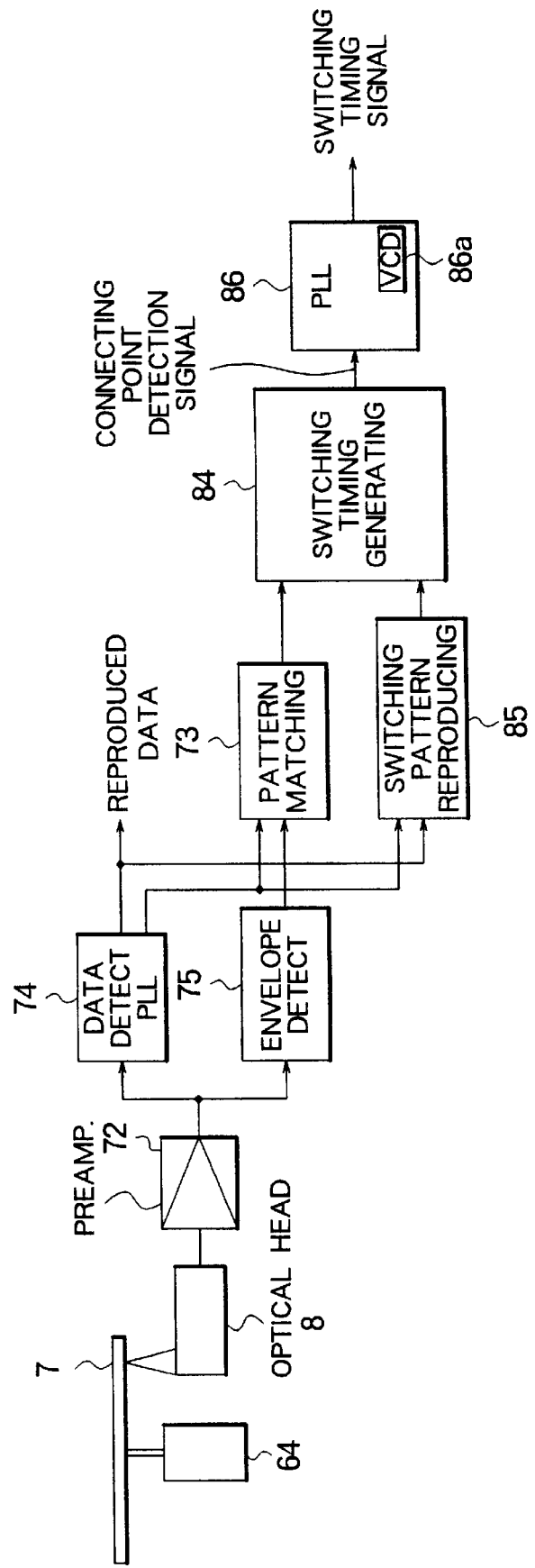
FIG. 13 is a block diagram showing another example circuit for protecting the timing of polarity switching.
Figure 14:
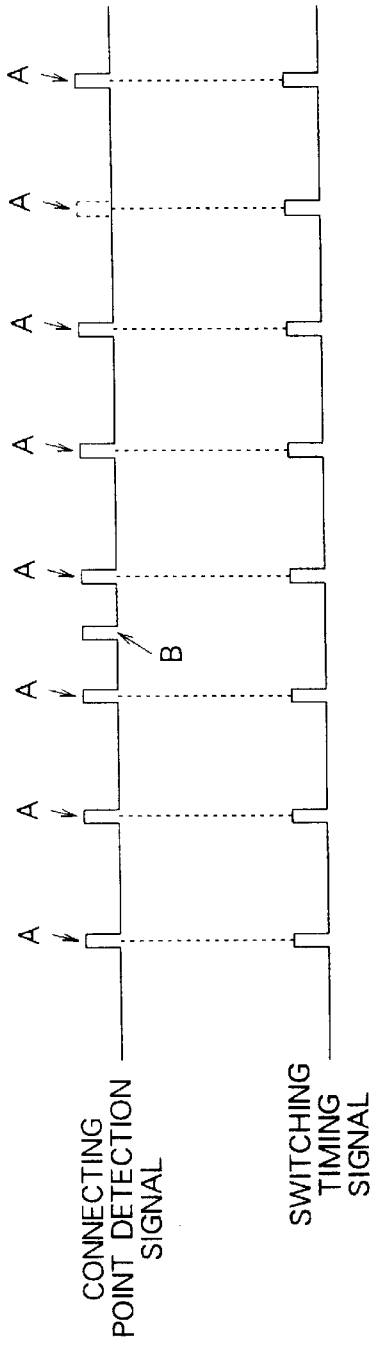
FIG. 14A and FIG. 14B are timing charts showing the operation of the device shown in FIG. 13.

FIG. 13 is a block diagram showing a circuit for detecting the polarity switching timing in different ways, and FIG. 14A and FIG. 14B illustrate the operation of the circuit of FIG. 13. Shown in FIG. 13 are a polarity switching timing generating circuit 84, a polarity switching pattern reproducing circuit 85, and a PLL circuit 86 for making up for the failure of detection by other means, as indicated by dotted line C in FIG. 14A, or disregarding erroneous detection of a connecting point due to a noise as indicated by B in FIG. 14A.

Figure 15:
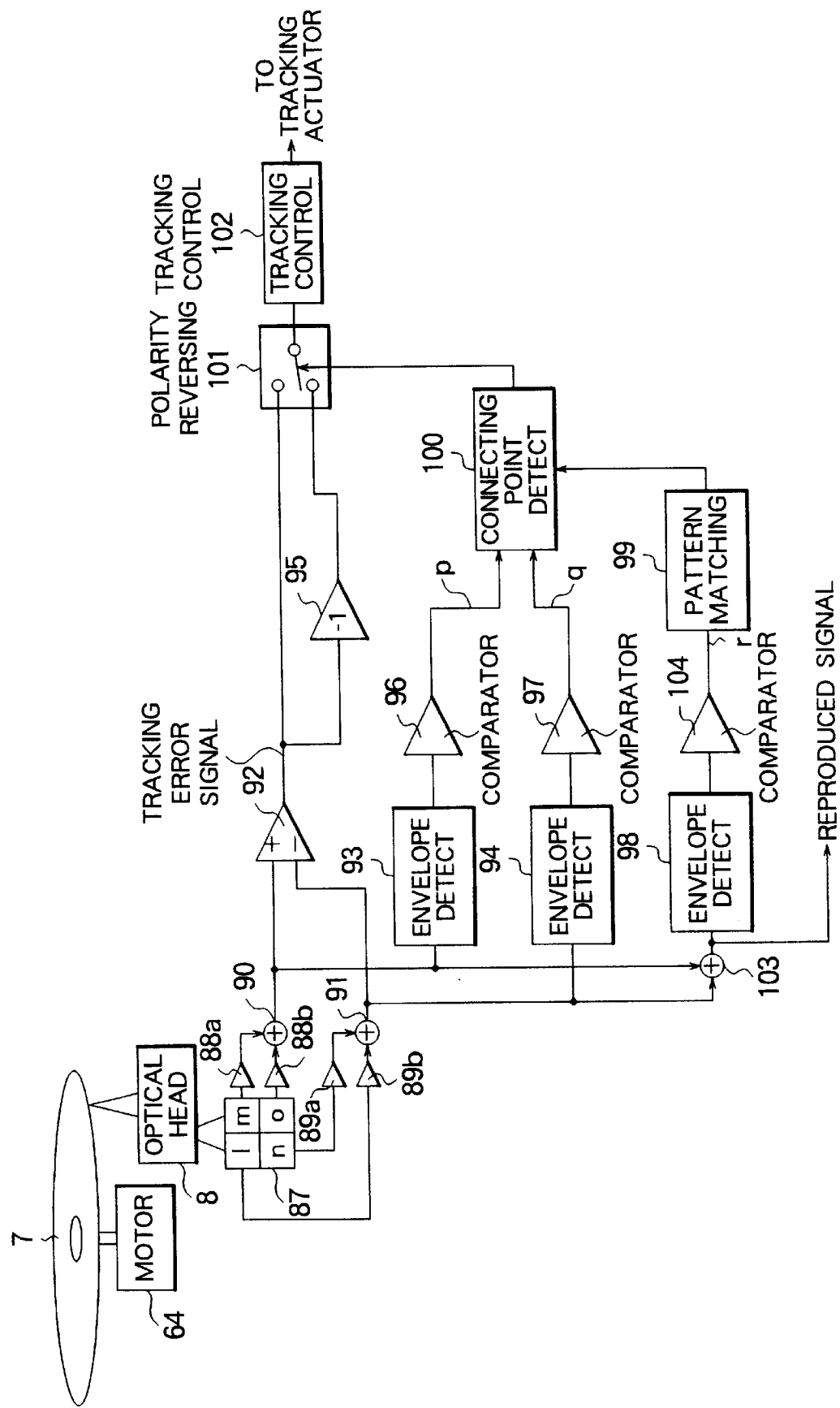
FIG. 15 is a block diagram showing a circuit for servo polarity switching.

FIG. 15 is a block diagram showing a circuit for detecting the land/groove polarity switching timing (connecting point) from the disposition of the wobble pits and the mirror surface part, and switching the servo-polarity. Shown in the drawing are a split photodetector 87 having four light receiving faces or channels l, m, n and o, I–V amplifiers 88a and 88b for amplifying the outputs of the two channels (m and o) on one side of the tracking sensor formed of the photodetector 87, I–V amplifiers 89a and 89b for amplifying the outputs of the two channels (l and n) on the other side of the tracking sensor formed of the photodetector 87, an adder 90 for adding the outputs of the I–V amplifiers 88a and 88b, another adder 91 for adding the outputs of the I–V amplifiers 89a and 89b, a differential amplifier 92 for determining the difference between the outputs of the adders 90 and 91, an envelope detector 93 detecting the envelope of the output of the adder 90, and thereby detecting the wobble signal, another envelope detector 94 detecting the envelope of the output of the adder 91, and thereby detecting the wobble signal, an inverter 95 for producing an inversion of the output of the differential amplifier 92, a comparator 96 for comparing the output or the envelope detector 93 with a certain threshold, and another comparator 97 for comparing the output of the envelope detector 94 with a certain threshold. The output p of the comparator 96 is High when the output of the envelope detector 93 is greater than the threshold, and is otherwise low. Similarly, the output q of the comparator 97 is High when the output of the envelope detector 94 is greater than the threshold, and is otherwise low.

An adder 103 adds adding the outputs of the adders 90 and 91, an envelope detector 98 determines the envelope of the output of the adder 103, which is the sum of the outputs of all the four light receiving faces, and a further comparator 104 compares the output of the envelope detector 98 with a certain threshold. The output r of the comparator 104 is high when the output of the envelope detector 98 is greater than the threshold, and is otherwise low.

A pattern matching circuit 99 performing pattern-matching on the output signal of the envelope detector 98, a connecting point detecting circuit 100 detects the timing of the polarity reversal or connecting point, from the signals p and q from the comparators 96 and 97, and the output of the pattern matching circuit 99, a polarity reversing circuit 101 selects the output of the differential amplifier 92 or the inverter 95 depending on the output of the polarity reversing circuit 100, and a tracking control circuit 102 controls a tracking actuator.

Figure 16:
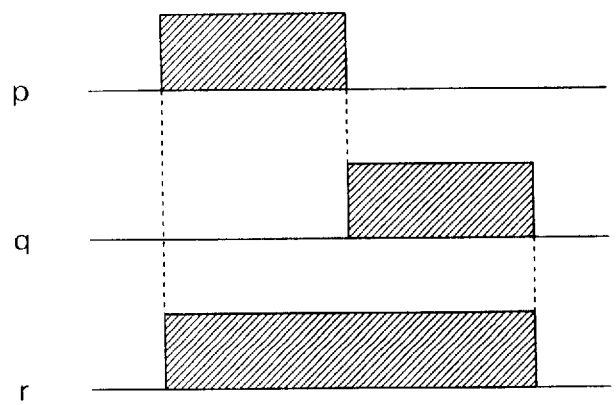
FIG. 16 and FIG. 17 are timing charts illustrating the operation of the device shown in FIG. 15.
Figure 17:
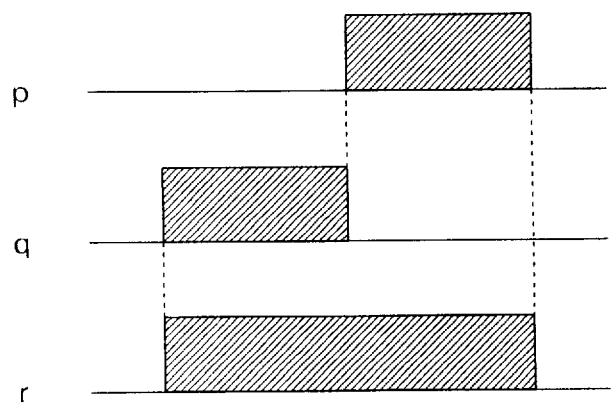
Figure 18:
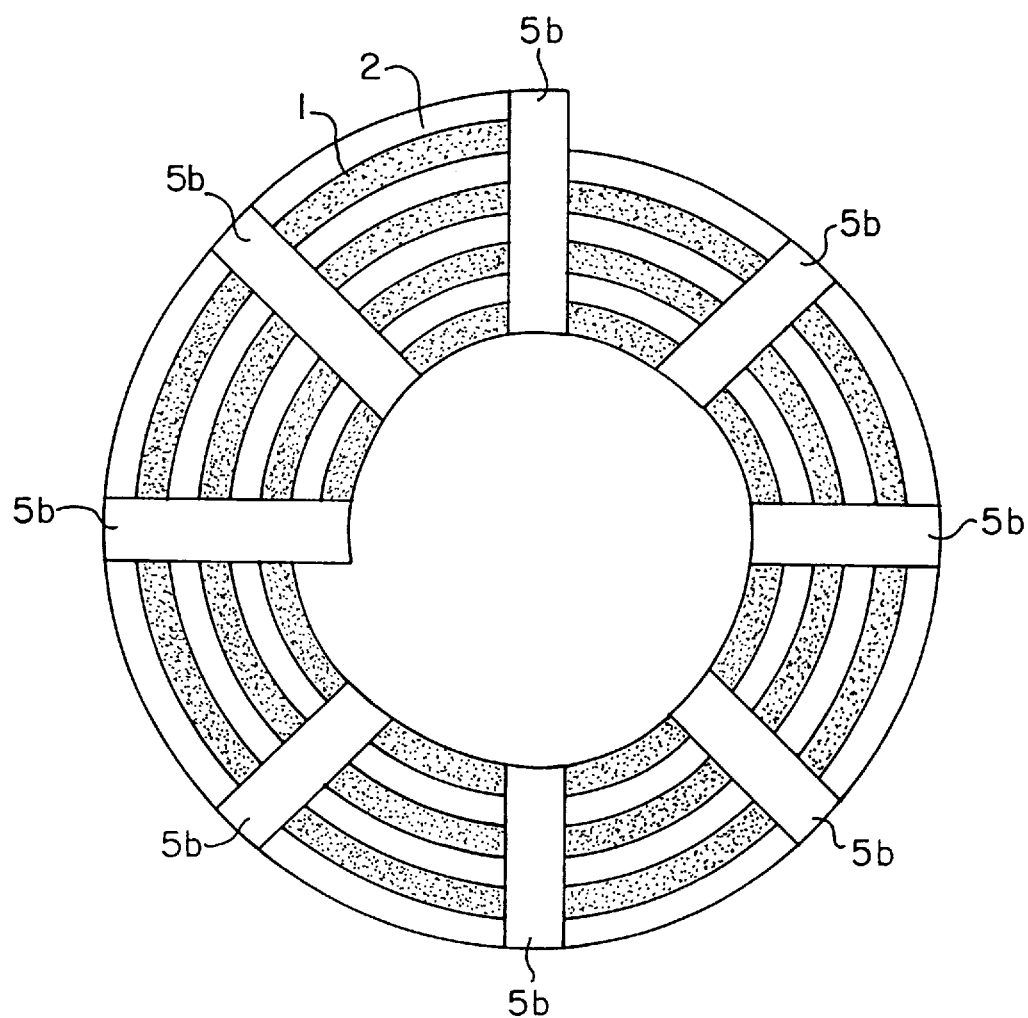
FIG. 18 shows an overall configuration of the land and groove tracks in a conventional optical disk.
Figure 20:
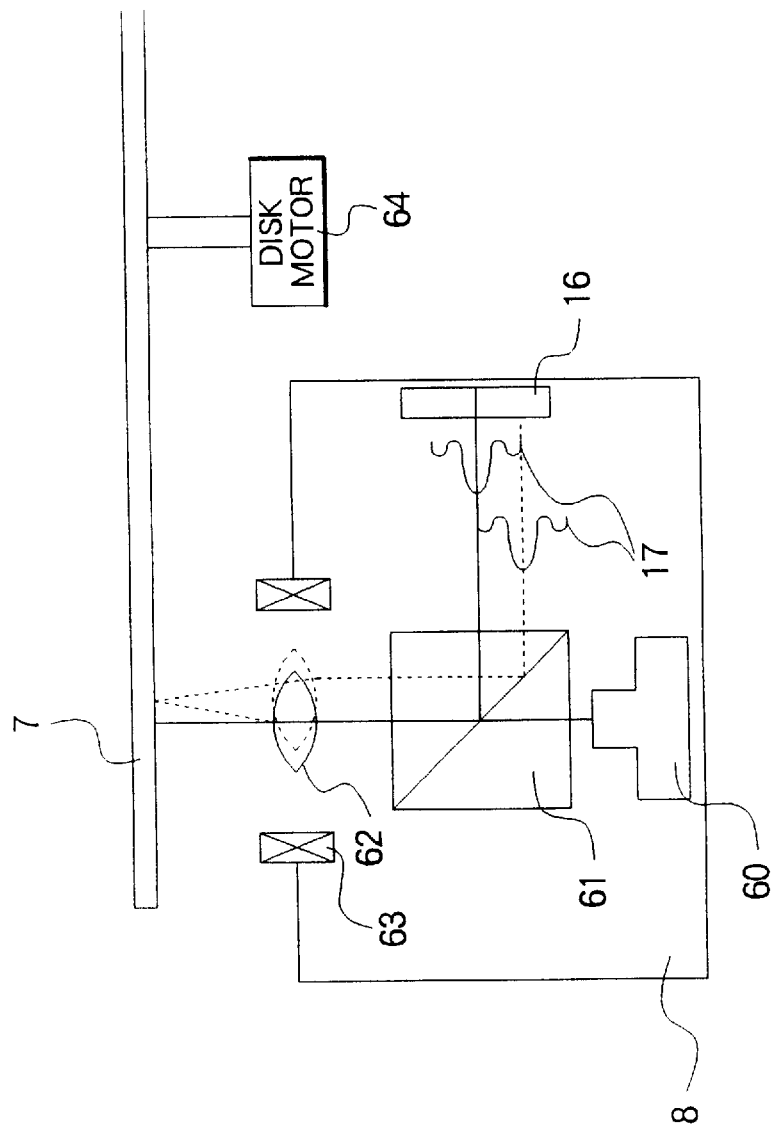
FIG. 20 shows how the offset is generated in the optical head.
Figure 21A:
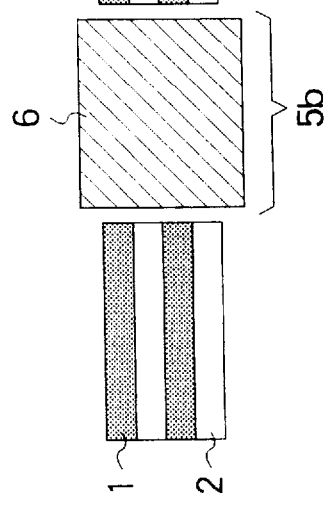
FIG. 21A and FIG. 21B show examples of configuration of header in the conventional optical disk.
Figure 21B:
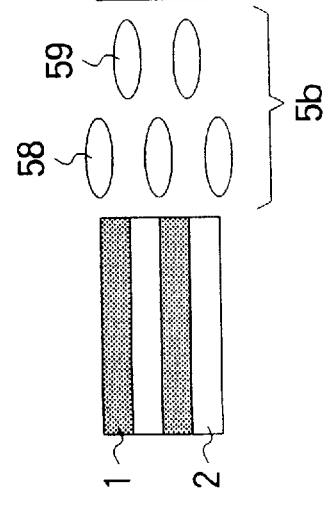
Figure 22:
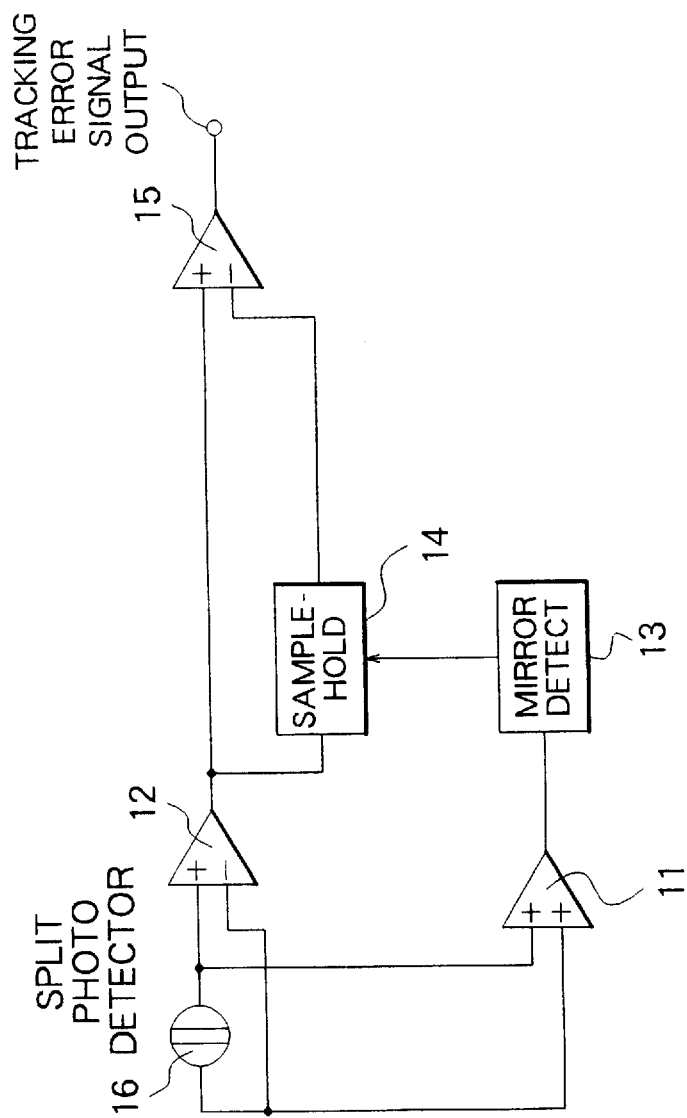
FIG. 22 is a block diagram showing a part of a conventional optical disk drive device concerning the tracking error signal offset correction using mirror surface parts.
Figure 23:
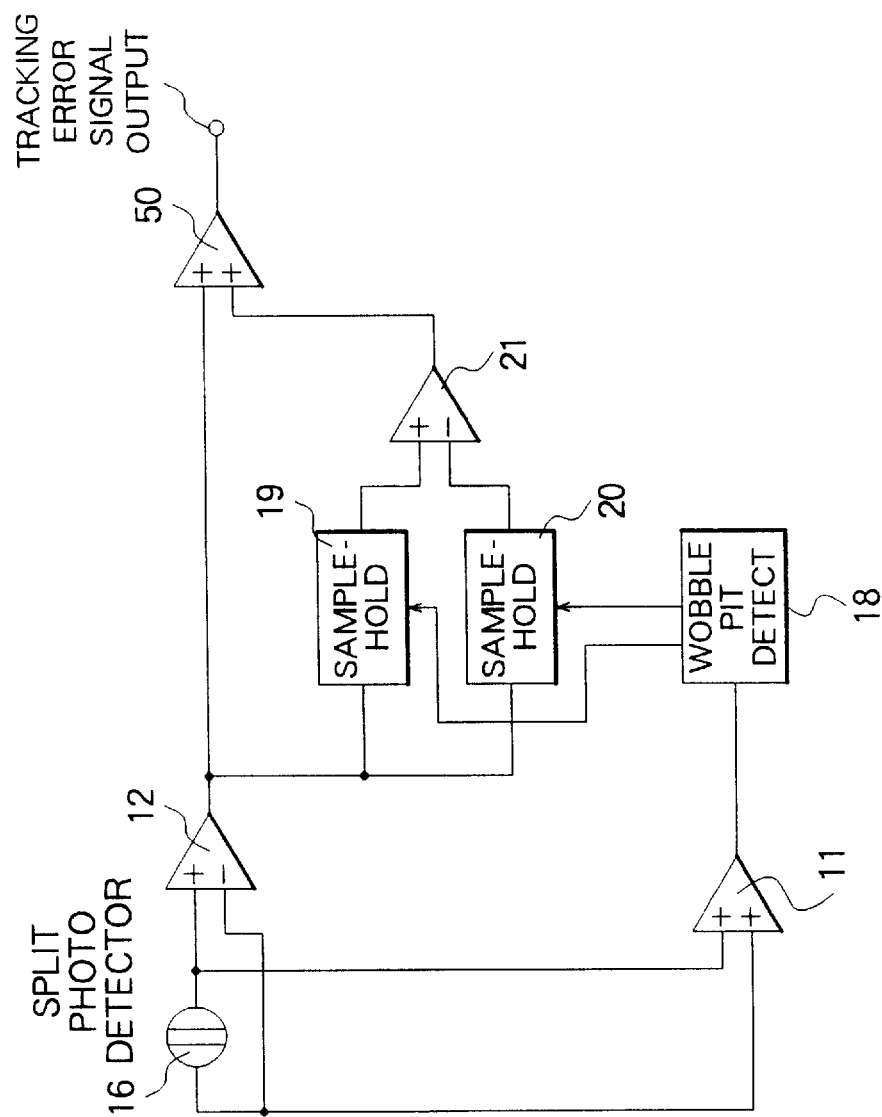
FIG. 23 is a block diagram showing a part of a conventional optical disk drive device concerning the tracking error signal offset correction using wobble pits.

FIG. 16 and FIG. 17 show the timing of the output of the p, q and r signals in FIG. 15, in a header in front of a sector in a land track, and in a header in front of a groove sector.

In the conventional optical disk with spiral grooves or lands, each revolution of a groove is connected to another revolution of a groove, and similarly each revolution of a land is connected to another revolution of a land. Accordingly, two spirals, one made up solely of a land, and another made up solely of a groove are present. In an optical disk in which a single continuous information track is formed, land tracks and groove tracks are connected together every revolution, with land track and groove track alternating every revolution along the track. In the optical disk shown in FIG. 1, data is recorded along a single spiral track, as in a compact disk (CD). The manner of the track jump may be identical to that performed on CD'S.

The conventional spiral track optical disk requires a special track jump, such as a jump from the tail end (outer end) of the land track to the leading end (inner end) of the groove jump. At such a part, the recording density is abruptly lowered. On the other hand, when tracks are formed by a mastering device, it is sufficient if a simple spiral is traced. In contrast, with the optical disk shown in FIG. 1, laser beam must be shifted in the radial direction by a track pitch every revolution. A more serious problem is that the tracking error signal polarity must be reversed every revolution. Particular problems are the occurrence of offset in the tracking error signal, and reversal of the polarity of certain components of the offset at the time of reversal of the tracking error signal.

Methods of removing offset include a correction method using a mirror surface part, and a correction method using wobble pits. In a conventional optical disk capable of recording and reproduction, header parts are formed in parts of the disk where no grooves are provided, and sector address and other information are pre-recorded in the form of embossed pits. In the case of land/groove recording, if the embossed pits are configured as shown in FIG. 3A and FIG. 3B, (and FIG. 2, or FIG. 4) the address pits themselves can be utilized as wobble pits.

In the case of the conventional address pit configuration shown in FIG. 19A, a laser beam used for the formation of the prepits must be less powerful than the laser beam used for forming the tracks cannot be used for forming the prepits, and the fabrication of the medium is therefore difficult. In addition, the cutting head of a cutting machine needs to be shifted in units of a track pitch. Moreover, in the case of the configuration of FIG. 19B, the same address is reproduced for the land and groove sectors adjacent to each other. It is therefore not possible to determine from the reproduced address alone whether the light spot, is scanning a land or a groove.

In contrast, in the case of the optical disk shown in FIG. 3A and FIG. 3B, (and FIG. 2, or FIG. 4), when the groove tracks are formed, the address pits are also formed using the same laser beam, being shifted by half a track pitch (by half a track pitch in one direction (e.g., radially outward) and then by half a track pitch in the other direction (e.g., radially inward). As a result, the fabrication of the disk is easy.

An advantage of the configuration shown in FIG. 3A and FIG. 3B (and FIG. 2, or FIG. 4) is that each track can be identified from the reproduced address information alone. For instance, for reproducing a land track 2a, the addresses are reproduced in the order of address A, address B, address A and then address B. When reproducing the adjacent groove track 1b, the addresses are reproduced in the order of address C, address B, address C and then address B. If, for instance, the address value is incremented in the order of scanning along the spiral, there is a relationship for instance.

A<B<C

If the value of the address read first is smaller than the value of the address read later (as in the case when the addresses read are in the order of A, B, A and B), then the sector following the header is in a land track. If the value of the address read first is larger than the value of the address read later (as in the case when the addresses read are in the order of C, A, C and B), then the sector following the header is in a groove track. Thus, on the basis of the relationship between the values of the addresses read in turn, whether the next, sector is in a groove track or in a land track can be determined.

It is also possible to determine whether the sector following the header is in a groove track or a land track on the basis of the tracking error signal as read while the light spot is scanning the sequences of the address pits, as described before.

The address pits are disposed alternately as wobble pits, and in addition, a mirror surface part 6 is also provided. It is therefore possible to remove unnecessary offset due to shift of the optical head or tilting of the disk, in particular that associated with the push-pull sensor method, as described in connection with the prior art example.

However, what is particularly problematical is that the polarity of the tracking error signal must be switched at the header 5a which appears once a revolution, as shown in FIG. 1. The tracking error signal $\Delta T$ immediately before a servo compensation circuit, obtained in a push-pull method is given by the following equation:

$$\Delta T = \Delta Ts + \Delta Tg + \delta + \Delta Tt + \Delta Ti + \Delta Th \quad (2)$$

where $\Delta Ts$ is a true tracking error signal;

$\Delta Tg$ is an offset, due to the shift of the objective lens;

$\delta$ is an offset due to the tilting of tie disk;

$\Delta Tt$ is an offset due to mounting error of the optical detector and stray light in the optical head;

$\Delta Ti$ is an offset from the detector to the polarity reversing circuit; and $\Delta Th$ is an offset from the polarity reversing circuit to the compensation circuit in a servo system.

The polarity of the true tracking error signal $\Delta Ts$ is reversed each time the track is changed from a land to a groove, or from a groove to a land. By reversing the polarity by the polarity reversing circuit 10, a correct tracking error signal can be obtained. Thus, the tracking error polarity reversal does no produce any problem with regard to $\Delta Ts$. On the other hand, the offset $\Delta Tg$ due to the shift of the lens and the offset $\delta$ due to the tilting of the disk occur independently of whether the light spot is scanning a land or a groove. If the polarity of the tracking error signal were reversed without taking the above in consideration, the reverse offset would be applied. It is thus necessary to alter or update the amount of correction for the offset components $\Delta Tg$ and $\delta$ obtained by the wobble pit method or mirror surface method.

In a method using $\Delta Tg$ calculated from the objective lens position sensor of the optical head, or a method for correcting after storing $\Delta Tg$ in a memory for one revolution of the track prior to tracking operation, correction will be made without reversing the polarity of $\Delta Tg$ at the time of tracking error signal polarity reversal.

With regard to $\Delta Tt$ and $\Delta Ti$, it is sufficient if the amounts of correction are determined before the device is used for operation, or when the device is shipped from the manufacturer, so that these offsets as well as $\Delta Th$, are in many cases, corrected by the offset adjustment and the like of the servo circuit. However, while the polarities of $\Delta Tt$ and $\Delta Ti$ are reversed at the time of tracking error signal polarity reversal, $\Delta Th$ is not reversed. As a result, offset errors having the same magnitude as and having an opposite polarity to $\Delta Tt$ and $\Delta Ti$ may be created. For this reason, as shown in FIG. 5, a sample-hold circuit 14 is provided at the back of the polarity reversing circuit 10 to sample and hold the tracking error signal at the time when the light spot passes the mirror surface part 6, and on the basis of the output of the sample-hold circuit 14, the original tracking error signal (tracking error signal as output from the differential amplifier 12) is corrected by the differential amplifier 15. In this way, the correction of the offset, including $\Delta Tt$ and $\Delta Ti$ can be achieved.

In the correction in the mirror surface method, $\Delta Tg$ and $\delta$ are also reversed by the polarity reversing circuit, so that it is necessary to correct them, after the tracking error signal polarity reversal, by the sample-hold circuit 14 in FIG. 5.

In this method in particular, the correction means needs to be provided in a stage subsequent to the polarity reversing circuit 10, and by this arrangement $\Delta Tt$ and $\Delta Ti$ which are offsets at the time of the tracking error signal polarity reversal can be corrected. If the polarity reversing circuit were disposed after the correction means, then, at the time of the tracking error signal polarity reversal, $\Delta Tt$ and $\Delta Ti$ in the opposite direction would be created, and the correction would become meaningless. Moreover, for the correction at the time of the tracking error signal polarity reversal, the polarity reversing circuit 10 must be switched to the reverse side before causing the sample-hold circuit 14 to operate, to effect the correction.

The above described correction is shown in FIG. 7. As illustrated, the address pits are reproduced by the PLL and data detecting circuit 36, and the pattern matching signal 27 is generated by the pattern matching circuit. 37, on the basis of the reproduced signal 25, and the polarity reversing circuit 10 is reversed in accordance with this signal. Then, responsive to the sample-hold timing signal 31 generated on the basis of the pattern matching signals 27 and 28, the tracking error signal at the time of the passage of the mirror surface is sampled and held.

The address pits are configured, after having been converted into a pattern which is not used for normal recording data. Accordingly, by matching this pattern in a digital circuit (in the pattern matching circuit 37), the pattern detection timing can be obtained, and together with the clock signal, the detection timing of the mirror surface can be obtained.

In this method, however, it is necessary to completely correct $\Delta Tt$ and $\Delta Ti$ at the differential amplifier 15. An offset adjustment means generally configured in a servo circuit in a subsequent stage needs to be so adjusted that $\Delta Tt$ and $\Delta Ti$ are not contained. Accordingly, in the offset adjustment of this method, the offset generated by the tracking error signal polarity reversal is corrected so that the voltage level after the correction will be zero or a predefined reference voltage, by means of the differential amplifier 15, and at the offset correction means in the servo circuit in the subsequent stage, only the deviation from the above-mentioned predefined voltage, due to the circuits, is corrected. In this case, the correction at the time of the tracking error signal polarity reversal is conducted when the light spot passes the mirror surface, so that the offset component alone is adjusted to be the predefined voltage, irrespective of the tracking error component.

When the adjustment at the time of tracking error signal polarity reversal is made using the wobble pits, the configuration shown in FIG. 6 is used. In this case, in the same way as the conventional method of detection of the sensor offset using wobble pits, the sum signal indicative of the amount of reflected light from the disk and incident on the photo-detector 16 of the optical head 8 is produced by the summing amplifier 11, and the PLL and data detecting circuit 36, the pattern matching circuit 37 and the wobble pit detecting circuit 18 detect the wobble pits, and produce a wobble pit detection timing signal. Responsive to this wobble pit detection timing signal, the sample-hold circuits 19 and 20 sample the output of the differential amplifier 12 during passage of the wobble pits, i.e., the two sequences of laterally shifted address pits. The difference between the outputs of the sample-hold circuits 19 and 20 is determined by the differential amplifier 21, so as to obtain a tracking error signal free from offset. This tracking error signal free from offset error is applied to the amplifier 22, where it is multiplied with a predefined gain. A difference between the output of the amplifier 22 (tracking error signal free from offset error) and the original tracking error signal is determined at the differential amplifier 23, so that the offset contained in the original tracking error signal is obtained.

Figure 24:
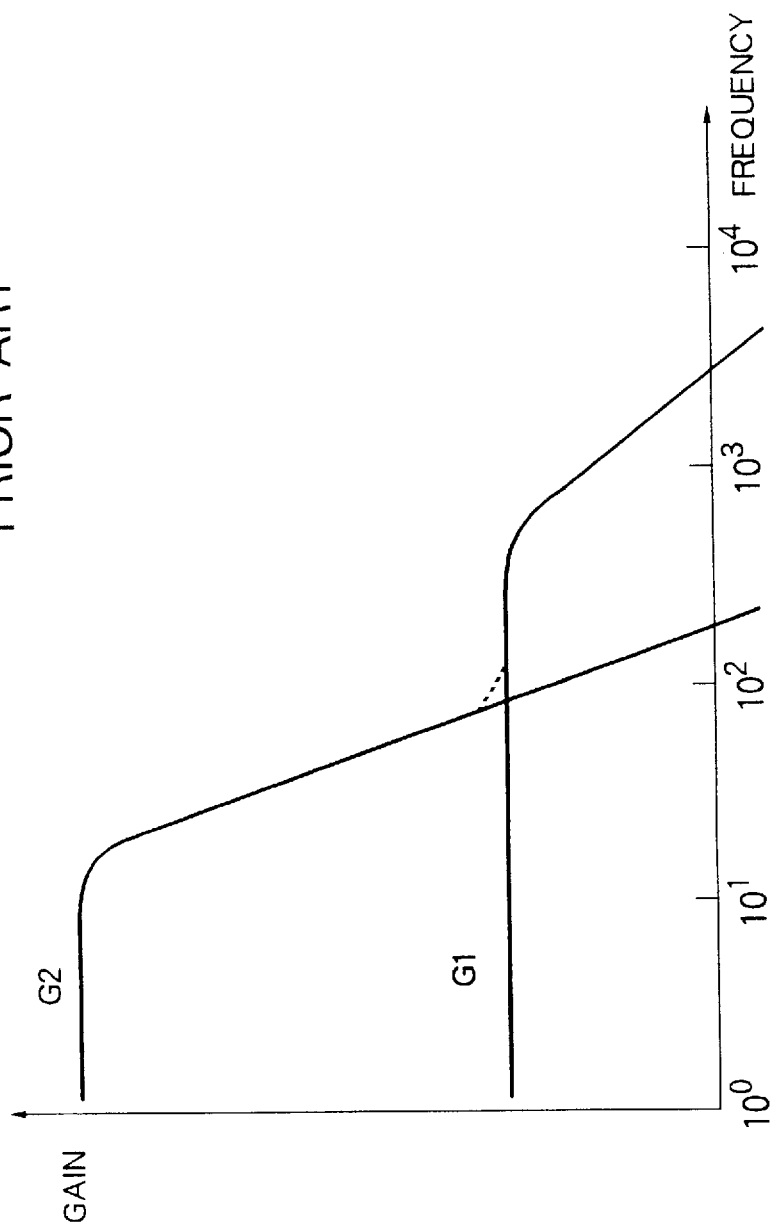
FIG. 24 shows control characteristics of the conventional optical disk drive using wobble pits and push-puss method.
Figure 25:
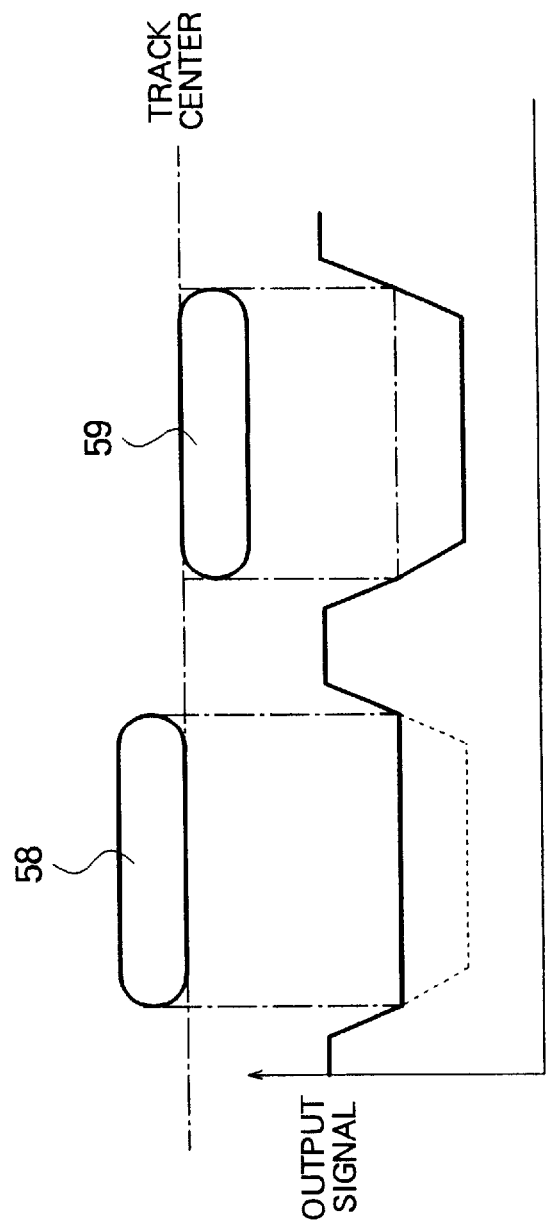
FIG. 25 shows waveforms of the outputs obtained from the wobble pits.

The amplifier 22 is provided to adjust the difference in the gain between the tracking error signal obtained from the wobble pits, and the tracking error obtained by the push-pull method. The offset signal thus obtained is subtracted at a differential amplifier, not shown, but is similar to the differential amplifier 15 in FIG. 5, from the tracking error signal for correction, as in the mirror surface correction. In the conventional wobble pit correction method, the correction is achieved through feedback, as shown in FIG. 24. In contrast, according to the present embodiment, the correction is equivalent to feed-forward correction operation. This is advantageous because the offset signal varies abruptly at the time of tracking error signal polarity reversal, and in such a situation, feedback correction is not quick enough and may disturb the servo system.

The above-described correction at the time of tracking error signal polarity reversal must be effected after confirming that the sector following the header region in question is at a connecting point and the tracking error signal polarity is to be reversed at the sector. If an erroneous address information were read, due to a scratch on the optical disk, and unnecessary tracking error signal polarity reversal were effected, tracking may fail. Whether or not the header region is at the connecting point must therefore be detected without fail. In Embodiment 1, if the data area is divided into annular zones and the number of sectors per revolution is constant throughout each zone, then by reading the address of the optical disk, whether or not the header region is at the connecting point can be detected from the arrangement of the sector numbers within the zone. For instance, let us assume that the number of sectors per revolution in a particular zone is m, and the address number "0," indicates the sector at (or next to the header region at) the first connecting point within the zone. Tracking error signal polarity reversal is effected at each of the sectors designated by a sector address equal to m×n (n being an integer). Accordingly, by detecting and decoding the sector address, whether the header being scanned is at a connecting point can be detected.

However, in such a method of reading the contents of the address pits, it, is possible that the polarity connecting point is erroneously detected because of mis-reading during data reproduction. Even if the address of sector at the connecting point is not detected, the address value is incremented one by one, so that by reading the address at an immediately preceding sector or a sector preceding by a known number or sectors, it is possible to predict the address of the sector where the connecting point is present, and/or to correct the errors in the address data reading.

However, at the time of the first tracking pull-in, or pull-in after a track access, it is necessary to make the judgment as to whether the header region is at the connecting point solely in accordance with information obtained at the header region in question. There is therefore a similar problem.

In this embodiment, whether the header being scanned is at, a connecting point can be determined by detecting the position and the size of the mirror surface part in the header 5. Headers for a sector one before the sector at a connecting point may have different configuration than the headers for other normal sectors. The headers shown in FIG. 8A to FIG. 11B may be used in combination for distinction between those at a connecting point, those for a sector one before a sector at a connecting point, and the headers at other normal sectors. For instance, the header shown in FIG. 10A may be used for a sector at a connecting point, the header shown in FIG. 9B may be used for a sector one before the sector at a connecting point, and the header shown in FIG. 9A may be used for other normal sectors. Alternatively, the header shown in FIG. 10B may be used for a sector at a connecting point, the header shown in FIG. 9B may be used for a sector one before the sector at a connecting point, and the header shown in FIG. 8B may be used for other normal sectors. In either case, it is possible to make the determination from the variation in the level of the envelope signal of the reproduced signal, i.e., without resorting to the address values (or recognition flags, not shown).

By detecting the sector one before the sector at a connecting point, the prediction of the connecting point can be made reliably.

Furthermore, the header parts for the sectors within each zone are aligned with each other in the radial direction, so that, by measuring the rotational angle of the disk motor on the basis of an output of a rotary encoder attached to the disk motor or the time interval between succeeding connecting points (the time taken for each revolution), the timing at which the connecting point will appear can be predicted on the basis of any of these measured values. However, the prediction of the timing may be associated with errors, so that the prediction is used in combination with the reading of the address, (or detection of the recognition flag, not shown) to improve the reliability of the detection of the connecting point.

FIG. 12 is a block diagram showing a circuit for protecting the switching timing. In a disk in which land and groove alternate every revolution, failure in detecting a connecting point will lead to failure of tracking. For this reason, when detection of a matching pattern for the detection of the connecting point or the sector address value fails due for example to a scratch on the disk or vibration of the device, the failure of detection of the polarity reversal timing must be made tip for. Two methods for the making tip the failure of detection will next be described with reference to FIG. 12.

A first method is to count the PLL clocks 74c from the data detecting PLL circuit 74, from the detection of the preceding sector address, and when the count becomes a predetermined value, then it is assumed that the connecting point has been reached (even when the detection of the connecting point by the address value or the recognition flag fails). Based on this detection of the connecting point, the polarity reversal is effected.

A second method is to store the rotary phase of the motor at the preceding connecting point, and when the rotary phase of the motor becomes the same as the stored rotary phase, then it is assumed that the connecting point has been reached (even when the detection of the address value or the recognition flag fails).

Another method of the compensation will next be described with reference to FIG. 13, FIG. 14A and FIG. 14B. This method utilizes the fact that the switching pattern has a periodicity because the connecting points within each zone are aligned in the radial direction in a disk of a zone CAV configuration.

For instance, if the position of the mirror surface part at the sector address formed of prepits is different between sectors which are at a connecting point and sectors which are not at a connecting point, then the connecting point can be detected by means of the pattern matching circuit 73 shown in FIG. 13, and at the same time, on condition that the sector addresses are erroneously detected due for example to scratches, the address at the connecting point is generated by the polarity switching pattern reproducing circuit 85, and the connecting point detection signal can be generated by the polarity switching timing generating circuit 84. However, erroneous detection due to noise as indicated by B in FIG. 14A, or failure of detection as indicated by C in FIG. 14A may occur. As a countermeasure, a PLL circuit 86 is provided in a succeeding stage, and, in addition, the oscillating frequency of the VCO 86a of the PLL circuit 86 is made to be identical to the frequency of rotation of the disk, correct timing signals, as shown in FIG. 14B, can be obtained at the output of the PLL circuit 86. The PLL circuit should be formed of a digital PLL, circuit, and may contain digital servo circuit.

The connecting point can be detected the change of the order of order of wobble pits at a connecting point. The order of the wobble pits is changed because such an order is different between a header for a land track sector and a header for a groove track sector, as will also be seen from FIG. 8A to FIG. 11B.

In this case, signals corresponding to the respective sides of the tracks (n+o and l+m in the case of FIG. 15) of a split detector 87 having four light, receiving faces l, m, n and o are reproduced, and the reproduced signals are envelope-detected, to become signals p and q in FIG. 16 (in front of a land sector) and FIG. 17 (in front of a groove sector). Whether the sector is at a connecting point or not can therefore be determined from the reproduced signal. This is because the wobble pits are shifted in the radial direction of the disk, i.e., laterally of the tracks, and that the order of the directions of the shifting of the wobble pits is reversed at a connecting point.

Also, by determining the envelope of the sum of all the four light receiving faces, it is possible to effect pattern matching the envelope for detecting the mirror surface parts in the header. In such a case, the arrangement of the mirror surface parts is detected based on the logical product r of the signals p and q, and the signal indicative of the arrangement the mirror surface parts is subjected to pattern-matching, to detect whether the header being scanned is at a connecting point or not. In this way, even more reliable detection of the connecting point can be achieved.

What is claimed is:

1. An optical disk device using an optical disk having a continuous information track formed of alternating land and groove revolutions, each land revolution being connected at a connecting point with a groove revolution, each revolution being divided into sectors by headers, each header having a mirror surface region, the disposition and/or length of the mirror surface region indicating whether the sector is at a connecting point between land and groove revolutions, said device comprising:

a disk motor for rotating the disk;

a detector for detecting a connecting point based on the position and/or length of the mirror surface region; and a predictor for predicting the connecting point based on the phase of the disk motor when a connecting point was previously detected, whereby any connecting point detection failure by said detector is made up for by said predictor.

2. An optical disk device using an optical disk having a continuous information track formed of alternating land and groove revolutions, each land revolution being connected at a connecting point with a groove revolution, each revolution being divided into sectors by headers, each header having a mirror surface region, said device comprising:

a data detecting circuit having a PLL circuit which produces clocking signals; and a predictor for predicting a connecting point by counting the clocking signals from the PLL circuit, from a preceding sector which was at a connecting point.

3. The optical disk device according to claim 2, wherein the disposition and/or length of the mirror surface region indicates whether the sector is at a connecting point between land and groove revolutions, said optical disk device further comprises a detector for detecting a connecting point based on the position and/or length of the mirror surface region and means for determining when a connecting point detection failure has occurred; and any connecting point detection failure by said detector is made up for by said predictor.

4. An optical disk device using an optical disk having a continuous information track formed of alternating land and groove revolutions, each land revolution being connected with a groove revolution at a connecting point, each revolution being divided into sectors by headers, each header having a mirror surface region, said optical disk device comprising:

means for rotating the disk;

a PLL circuit which generates clocking signals and includes a voltage controlled oscillator having a center frequency at the frequency of the rotation of the disk; and a predictor for predicting a connecting point based on the output of the PLL circuit, by counting the clocking signals from the PLL circuit from a preceding sector which was at a connecting point.

5. The optical disk device according to claim 4, wherein the disposition and/or length of the mirror surface region indicates whether the sector is at a connecting point between land and groove revolutions, said optical disk device further comprises a detector for detecting a connecting point based on the position and/or length of the mirror surface region and means for determining when a connecting point detection failure has occurred; and any connecting point detection failure by said detector is made up for by said predictor.

6. An optical disk comprising: a continuous information track formed of alternating land and groove revolutions, each land revolution being connected with a groove revolution at a connecting point, each revolution being divided into sectors by headers, pit sequences in said headers being shifted in the radial direction to form wobble pits, an order of the shifting directions of the pit sequences as they are scanned by a light spot being changed at a connecting point.

7. The optical disk according to claim 6, wherein each header has a mirror surface region, and at least one of the disposition and length of the mirror surface region indicates whether the sector is at a connecting point between land and groove revolutions.

8. An optical disk device using an optical disk having a continuous information track formed of alternating land and groove revolutions, each land revolution being connected with a groove revolution at a connecting point, each revolution being divided into sectors by headers, pit sequences in the headers being shifted in the radial direction to form wobble pits, an order of the directions of the shifting of the pit sequences as they are scanned by a light spot being changed at a connecting point, said device comprising:

means for illuminating and scanning the disk with a light spot;

means for detecting an envelope of the reproduced signal as the light spot scans the wobble pits;

means responsive to the output of the envelope detecting means for detecting the order of the shifting of the wobble pits as the light spot scans a header; and means responsive to the output of the order detecting means for determining whether the header being scanned is at a connecting point or not.

9. The optical disk device according to claim 8, wherein said optical disk device further comprises:

a split photodetector, having four light receiving faces, for reproducing the recorded information and detecting servo error information; and means responsive to the outputs of the four light receiving faces for reproducing the wobble pits from the light receiving faces on the respective sides of the split photodetector.

10. The optical disk device according to claim 8, wherein said means for determining whether the header being scanned is at a connecting point comprises means for performing pattern matching on the output of the envelope detecting means.

11. The optical disk according to claim 6, wherein said pit sequences are shifted in first and second radial directions.

* * * * *